US011326016B1

(12) United States Patent
Kriesel et al.

(10) Patent No.: US 11,326,016 B1
(45) Date of Patent: *May 10, 2022

(54) STABILIZED SECTIONALIZED CONTAINMENT COMBINATION

(71) Applicant: Universal Tech Corporation, Ettrick, WI (US)

(72) Inventors: Matthew Wayne Kriesel, Melrose, WI (US); Troy Bradley Goodenough, Mindoro, WI (US)

(73) Assignee: Universal Tech Corporation, Ettrick, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/480,019

(22) Filed: Sep. 20, 2021

Related U.S. Application Data

(63) Continuation-in-part of application No. 15/731,815, filed on Aug. 7, 2017, now Pat. No. 11,124,596, which is a continuation-in-part of application No. 14/999,722, filed on Jun. 20, 2016, now Pat. No. 10,807,767.

(60) Provisional application No. 62/231,004, filed on Jun. 22, 2015.

(51) Int. Cl.
*C08G 18/10* (2006.01)
*C08G 18/76* (2006.01)
*C08G 18/48* (2006.01)
*B65D 25/04* (2006.01)

(52) U.S. Cl.
CPC ............ *C08G 18/10* (2013.01); *B65D 25/04* (2013.01); *C08G 18/48* (2013.01); *C08G 18/4812* (2013.01); *C08G 18/7671* (2013.01)

(58) Field of Classification Search
CPC .... C08G 18/10; C08G 18/48; C08G 18/4812; C08G 18/7671; B65D 25/04
See application file for complete search history.

(56) References Cited

U.S. PATENT DOCUMENTS

| | | | | |
|---|---|---|---|---|
| 3,507,071 A * | 4/1970 | Newton | ................. | A01K 97/06 43/57.1 |
| 5,677,413 A * | 10/1997 | Barksby | ................. | C08G 18/10 528/65 |
| 5,864,001 A * | 1/1999 | Masse | .................... | C08G 18/10 528/75 |
| 6,588,511 B1 * | 7/2003 | Kriesel | ..................... | A01L 7/02 168/14 |
| 6,673,409 B1 * | 1/2004 | Wheatley | ................. | B60R 7/02 296/97.3 |

(Continued)

*Primary Examiner* — Rabon A Sergent
(74) *Attorney, Agent, or Firm* — Bryan R. Rosiejka

(57) ABSTRACT

The invention provides a unique system for providing partition dividers in stowing units (e.g. shelving, trays, and containers). This is accomplished by providing a stowing unit with an adhesive viscoelastomeric thermoset polymer which adhesively restrains a free-standing divider adapted to be removed and repositioned at any desired positon to fit a user's stowing needs. The adhesive polymer is also cohesive and releases both the divider and any stowed items in contact with the polymer via the application of a counteracting removal force sufficient to overcome the adhesive attraction of the polymer. Accordingly, dividers fixedly attached to conventional sectionalized containers are suitably replaced herein by the repositionable divider combination.

20 Claims, 7 Drawing Sheets

(56) References Cited

U.S. PATENT DOCUMENTS

| | | | | |
|---|---|---|---|---|
| 6,896,065 B2* | 5/2005 | Kriesel | | A01L 7/02 168/12 |
| 7,041,719 B2* | 5/2006 | Kriesel | | A01L 7/02 524/114 |
| 7,125,602 B2* | 10/2006 | Wheatley | | B60R 7/02 428/156 |
| 7,252,867 B2* | 8/2007 | Wheatley | | B60R 11/00 296/97.3 |
| 7,910,188 B2* | 3/2011 | Wheatley | | B60R 7/02 428/40.1 |
| 7,923,088 B2* | 4/2011 | Wheatley | | B60R 11/02 428/40.1 |
| 8,110,269 B2* | 2/2012 | Wheatley | | B60R 11/02 428/40.1 |
| 8,110,270 B2* | 2/2012 | Wheatley | | B60R 11/02 428/40.1 |
| 8,302,213 B2* | 11/2012 | Kriesel | | A41D 13/0151 2/102 |
| 9,974,342 B1* | 5/2018 | Kriesel | | A41D 13/0512 |
| D880,950 S * | 4/2020 | Kriesel | | D7/602 |
| 10,681,830 B1* | 6/2020 | Goodenough | | G06F 1/1637 |
| 10,717,582 B1* | 7/2020 | Goodenough | | H05K 5/0217 |
| 10,807,767 B1* | 10/2020 | Kriesel | | B65D 33/06 |
| D902,584 S * | 11/2020 | Kriesel | | D3/260 |
| 10,914,087 B1* | 2/2021 | Kriesel | | C09J 4/00 |
| 2004/0191446 A1* | 9/2004 | Kriesel | | A01L 7/02 428/35.7 |
| 2004/0200623 A1* | 10/2004 | Kriesel | | A01L 5/00 168/4 |
| 2005/0019587 A1* | 1/2005 | Luhmann | | C08G 18/755 428/423.1 |
| 2005/0027091 A1* | 2/2005 | Luhmann | | C08G 18/227 528/44 |
| 2006/0272367 A1* | 12/2006 | Kriesel | | E05B 75/00 70/16 |
| 2006/0287147 A1* | 12/2006 | Kriesel | | A63B 22/02 474/237 |
| 2007/0254152 A1* | 11/2007 | Schumann | | C09J 175/08 428/355 N |
| 2008/0005929 A1* | 1/2008 | Hardy | | A43B 13/188 36/29 |
| 2008/0026658 A1* | 1/2008 | Kriesel | | A63B 71/081 442/182 |
| 2008/0250729 A1* | 10/2008 | Kriesel | | E04F 15/203 52/145 |
| 2009/0042676 A1* | 2/2009 | Kriesel | | A63B 49/02 473/524 |
| 2010/0170139 A1* | 7/2010 | Zhou | | A01K 97/06 43/54.1 |
| 2012/0222457 A1* | 9/2012 | Kriesel | | E05B 75/00 70/16 |
| 2013/0288060 A1 | 10/2013 | Pind et al. | | |
| 2013/0296449 A1 | 11/2013 | Peterson et al. | | |
| 2015/0053583 A1* | 2/2015 | McCormick | | A45C 11/00 206/521 |

* cited by examiner

STABILIZED SECTIONALIZED CONTAINMENT COMBINATION

CROSS-REFERENCE TO RELATED APPLICATIONS

This application is a Continuation-In-Part of, and claims priority to, U.S. Nonprovisional application Ser. No. 15/731,815 filed Aug. 7, 2017, which is a Continuation-In-Part of U.S. Nonprovisional application Ser. No. 14/999,722 filed Jun. 20, 2016, which is a Nonprovisional application of U.S. Provisional Application No. 62/231,004 filed Jun. 22, 2015, all of which applications are incorporated herein by reference in their entirety.

TECHNICAL FIELD

The present disclosure relates to adhesive containers and containment systems. In some more particular embodiments, the present invention relates to re-configurable partitioned containment combinations.

BACKGROUND

Conventional sectionalized containers generally consist of a container fitted with either a solid divider of a unitary construction integral with the container itself or an insertable divider designed to fit snuggly into a fastening mechanism such that the divider is fixedly attached within the confines of a container. Such conventional sectionalized containers are useful for keeping item separated or segregated within the containers and are illustratively used for storing tableware, tools, ammunition, fishing tackle, jewelry, medications, sewing items, office items, etc. Conventional insertable dividers are typically adapted to snuggly mate into grooved slots or sidewalls of conventional containers. Accordingly, such grooved sidewalls provide support to the insertable dividers, and thus severely limit the ability of a user to modify the configuration of conventional sectionalized containers.

In general, insertable dividers within conventional sectionalized containers rely upon a fixed position of support within the container to position and maintain the divider at a fixedly attached position so as to segregate stowed items contained therewithin. As such, the dividers are generally immovable and fixed within the container, providing no leeway to account for differences in the quantum or size of stowed items to be contained within the divided sections or compartments of such containers.

Moreover such conventional sectionalized containers most commonly contain loosely stowed items which are readily prone to displacement. This often leads to a messy displacement of stowed items within the respective compartments, particularly if the container is dropped or otherwise exposed to a jarring impact force.

Thus, there is a need for an improved system of sectionalized containers used for the stowage of items. There is also a need for sectionalized containers wherein the dividers are movably adjustable or repositionable such that the dividers may be randomly repositioned at any desired configuration to accommodate the particular needs of the user and/or items to be stowed in the container. There is a further need for a containing system which protects and stabilizes stowed items and dividers against movement within the container.

SUMMARY

The present invention solves one or more of the needs enumerated above. In some embodiments, the present invention provides an inventive adjustable divider containment combination which may be adjusted to any desired configuration to meet the specific stowage needs of a user. Additionally, the inventive containment combination allows for stabilization (against movement) of divider positioning, as well as stowed items placed thereon. Unlike conventional sectionalized containers which are prone to external movement caused by jarring stowed items, the present invention adhesively stabilizes stowed items against movement. The inventive combination comprises a cohesive interfacing adhesive composition which stabilizes both a partitioning divider and stowed items against movement. Removal of the stowed items and the divider can be accomplished by simply applying a counteracting force sufficient to overcome the adhesive attraction of the adhesive composition.

Unlike conventional sectionalized containers, the present invention provides for one or more free-standing containment dividers which may be releasably positioned to any desired position by the stowage user, thus eliminating the need for preset divider support elements. The invention comprises a releasable cohesive and adhesive thermoset polymer which adhesively stabilizes and immobilize a free-standing containment divider member, as well as any adhered stowed items in contact therewith, against movement. The containment divider can be released from the polymer (via a counteracting removal force by a user) and repositioned upon the polymer to any desired configuration to accommodate the stowage needs of a user at any given time. Accordingly, dividers may be placed so as to accommodate the size, shape or number of stowed items to be stowed in any given divided space. Should the needed space for the stowed items change, the containment divider members may be readily repositioned to accommodate the necessary change in needs. Accordingly, the inventive containment combination does not require permanently affixed dividers or confining/slotted walls to restrain stowed items and the divider members since the adjustable divider member and adhesive polymer combination of the present invention provide adequate detainment for both the stowed items and the divider. Consequently, simple surfaces (e.g., shelving, trays, countertops, etc.) may be utilized with the present invention as there is no need for the customary rigid sidewalls required by conventional sectionalized containers.

In some preferred embodiments, a sectionalized containment combination comprises a support member, an adhesive and cohesive viscoelastomeric thermoset polymer disposed upon the support member, and a divider member adhesively disposed upon the polymer, wherein the divider member can be removed and repositioned to adjust the sectionalized containment combination to a desired configuration for stowage use.

In some aspects of these embodiments, the divider member is a free-standing divider member. In other aspects of these embodiments, the sectionalized containment combination further comprises releasability properties such that the divider member can be removed upon application of a sufficient removal force without detachment of the polymer from the support member.

In some aspects of these embodiments, the polymer is derived from a thermosetting reaction media comprising about 2 wt % to about 10 wt % isocyanate prepolymer, about 35 wt % to about 75 wt % polyols, and about 10 wt % to about 60 wt % plasticizer, wherein the polyols comprise about 1 wt % to about 65 wt % straight chain diol by weight of the reaction media and about 3 wt % to about 50 wt % crosslinking polyol by weight of the reaction media, and wherein the plasticizer comprises about 10 wt % to less than 50 wt % epoxidized triglyceride plasticizer by weight of the reaction media and about 0 wt % to about 40 wt % viscosity reducing plasticizer by weight of the reaction media. In some further aspects, the plasticizer comprises about 10 wt % to less than 45 wt % epoxidized triglyceride plasticizer by weight of the reaction media. In other further aspects, the isocyanate prepolymer comprises a diisocyanate. In still other further aspects, the crosslinking polyol comprises triol. In yet other further aspects, the polymer component of the sectionalized containment combination comprises a straight chain diol to crosslinking polyol weight ratio of about 1:3 to about 3:1. In still other further aspects, the viscosity reducing plasticizer is an ester plasticizer.

In some aspects of these embodiments, the polymer comprises an adhesiveness of about 100 gf/cm$^2$ to about 2,500 gf/cm$^2$ as measured by the Adhesiveness and Cohesiveness Test. In other aspects of these embodiments, the support member comprises a substantially flat structure substantially free from any other confining structure. In still other aspects of these embodiments, an item disposed upon the sectionalized containment combination is substantially prevented from movement thereupon.

In some aspects of these embodiments, the sectionalized containment combination comprises cleansability and reusability properties, wherein a contaminant adhered to the polymer can be removed therefrom via washing with water, and wherein an adhesiveness of the polymer substantially returns to its original state upon fully drying. In other aspects of these embodiments, the sectionalized containment combination comprises antimicrobial properties.

In some preferred embodiments, a method of providing a sectionalized containment combination for segregating items and stabilizing the items against movement comprises:
 a) providing a support member;
 b) disposing an adhesive and cohesive viscoelastomeric thermoset polymer upon a surface of the support member; and
 c) adhesively engaging a repositionable divider member onto the polymer at a desired partitioning position.

In some aspects of these embodiments, the polymer is prefabricated prior to disposing the polymer upon the support member. In other aspects of these embodiments, the polymer has been cured in situ upon the support member. In still other aspects of these embodiments, the polymer is derived from a thermosetting reaction media comprising about 2 wt % to about 10 wt % isocyanate prepolymer, about 35 wt % to about 75 wt % polyols, and about 10 wt % to about 60 wt % plasticizer, wherein the polyols comprise about 1 wt % to about 65 wt % straight chain diol by weight of the reaction media and about 3 wt % to about 50 wt % crosslinking polyol by weight of the reaction media, and wherein the plasticizer comprises about 10 wt % to less than 50 wt % epoxidized triglyceride plasticizer by weight of the reaction media and about 0 wt % to about 40 wt % viscosity reducing plasticizer by weight of the reaction media.

In some preferred embodiments, a method for adjusting a sectionalized containment combination for segregating items comprises:
 a) providing a sectionalized containment combination comprising a support member, an adhesive and cohesive viscoelastomeric thermoset polymer and a free-standing divider member, wherein the polymer is disposed upon a surface of the support member, and wherein the divider member is disposed upon the polymer;
 b) removing the divider member from the sectionalized containment combination by exerting a sufficient removal force to counteract an adhesiveness of the polymer; and
 c) disposing the divider member onto the polymer in a different configuration position.

In some aspects of these embodiments, the polymer is derived from a thermosetting reaction media comprising about 2 wt % to about 10 wt % isocyanate prepolymer, about 35 wt % to about 75 wt % polyols, and about 10 wt % to about 60 wt % plasticizer, wherein the polyols comprise about 1 wt % to about 65 wt % straight chain diol by weight of the reaction media and about 3 wt % to about 50 wt % crosslinking polyol by weight of the reaction media, and wherein the plasticizer comprises about 10 wt % to less than 50 wt % epoxidized triglyceride plasticizer by weight of the reaction media and about 0 wt % to about 40 wt % viscosity reducing plasticizer by weight of the reaction media.

Numerous other features and advantages of the present invention will appear from the following description. In the description, reference is made to exemplary embodiments of the invention. Such embodiments do not represent the full scope of the invention. Reference should therefore be made to the claims herein for interpreting the full scope of the invention. In the interest of brevity and conciseness, any ranges of values set forth in this specification contemplate all values within the range and are to be construed as support for claims reciting any sub-ranges having endpoints which are real number values within the specified range in question. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

FIGURES

The foregoing and other features, aspects and advantages of the present invention will become better understood with regard to the following description, appended claims and accompanying drawings where:

Figure 5:
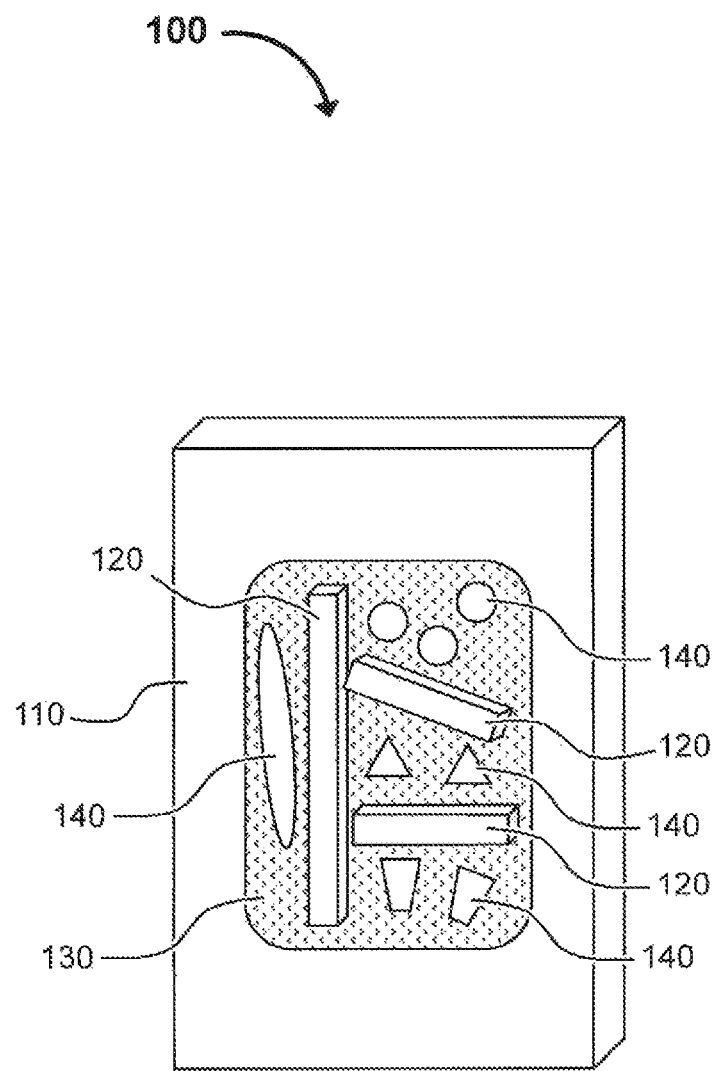
Figure 6:
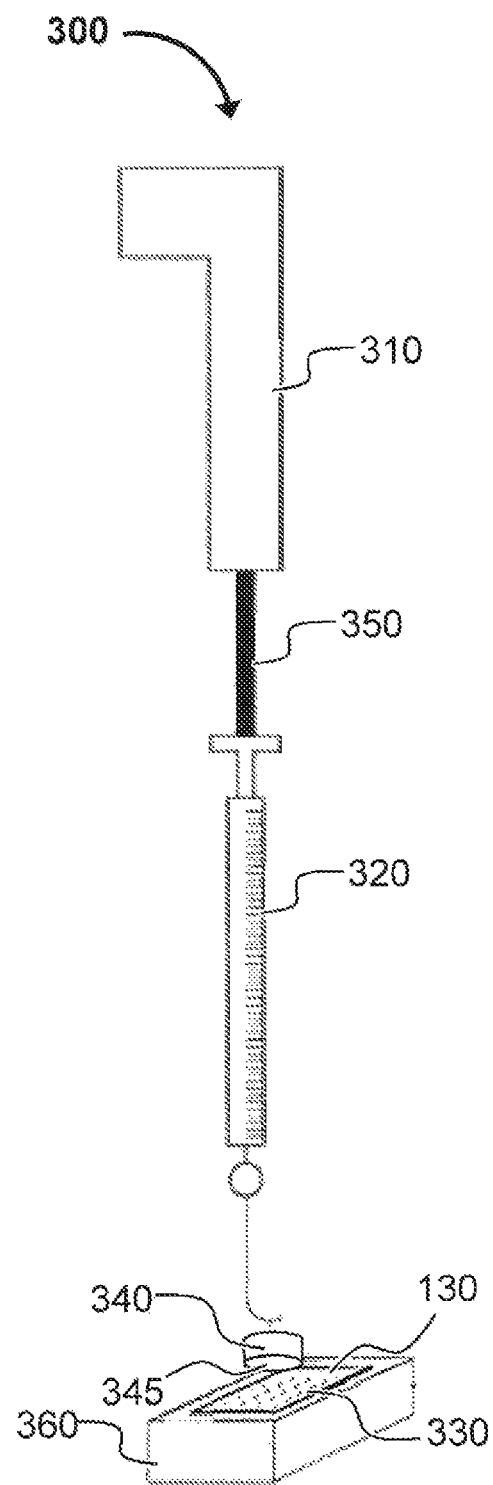

FIG. 5 is a perspective view showing a non-limiting exemplary embodiment of an inventive sectionalized containment combination of the present disclosure comprising a plurality of free-standing repositionable divider members and a plurality of stowable items disposed upon a layer of polymer, which is disposed upon a support member which is generally vertically mounted to a wall; and FIG. 6 is a front perspective view showing a testing apparatus for the Adhesiveness & Cohesiveness Test.

Repeated use of reference characters in the present specification and drawings is intended to represent the same or analogous features or elements of the present invention. It should be understood that the drawings herein are not intended to be drawn to scale, but rather are drawn to show particular elements of the invention.

Test Methods

Adhesiveness & Cohesiveness Test

Referring to FIG. 6, the illustrated testing apparatus 300 can be utilized for testing the adhesiveness, cohesiveness and releasability properties of various different viscoelastomeric thermoset polymers 130 of the present invention. The test apparatus 300 includes a motor driven actuator 310 (similar in concept to that of a standard remote controlled electric garage door opener, such as a Model 3265, available from The Chamberlain Group, Inc., having a place of business located in Elmhurst, Ill. 60126, U.S.A.) or equivalent. The actuator 310 includes a reversible constant speed motor (2.7 cm/sec which is occluded from view) serving to drive a remotely controlled reciprocating test probe 350 connected to a measuring scale 320 to measure adhesiveness, which is the amount of applied force (in grams-force) needed to separate each polymer 130 test sample 330 from a polished nickel cylinder 340 weighing 20.0 grams and having a contact surface area 345 of 1.76 cm$^2$, thus providing measurements in units of grams-force per square centimeter (gf/cm$^2$). A testing platform 360 of a laterally movable form is utilized to provide a solid, flat and level surface which allows for repositioning of the test sample 330 to provide an accurate repetition of the test results for each tested sample. Such testing platform 360 should be of a sufficient weight such that it does not lift from the surface during testing. The testing platform 360 may thus be repositioned to provide a repetition of an untested portion of the test sample 330 for further testing. Accordingly, adhesiveness is measured as the average of ten (10) repetitions upon untested portions of a single polymer 130 test sample 330.

The testing procedure is also useful for determining the cohesiveness of the viscoelastomeric thermoset polymer 130 test sample 330. This is accomplished by observing and noting the presence or absence of polymeric residue from each polymer 130 test sample 330 upon the test cylinder surface 345 after separating the cylinder 340 from the test sample 330 via the test procedure. The cylinder surface 345 should be cleaned of any residue between each repetition, and the cohesiveness is measured as the average amount of residue over ten (10) repetitions upon untested portions of a single test sample 330.

In addition, additional testing can include the application of pressure to the cylinder 340 when in contact with a polymer 130 test sample 330. By measuring the adhesiveness and cohesiveness of each test sample 330 under differently applied sample application pressures, the adhesive and cohesive effects from applying such different pressures can likewise be determined.

Similarly, adhesiveness changes measured over timed sequence intervals can also be determined so as to provide adhesive data upon a polymer 130 test sample's 330 adhesiveness stability. The test procedure can also be utilized to provide adhesiveness data upon short interval adhesiveness increases following an initial adhesive attachment of the cylinder surface 345 to the test sample 330. Differences in adhesiveness between pressure and non-pressure applied test probe over timed intervals can also be determined.

Continuing with FIG. 6, the following more detailed methodology can be utilized to test the adhesiveness and cohesiveness of various polymer 130 test samples 330:

1. Scope
   1.1. This method measures the level of tackiness (adhesiveness) exhibited by adhesive materials and the cohesiveness of such materials, optionally taking into account time dependent and/or pressure dependent adhesiveness properties.
   1.2. This test is designed for use with materials that exhibit adhesive properties, but may also be used with materials not explicitly classified as adhesives, including but not limited to materials having adhesive-like properties.
   1.3. Units—The tested values of adhesiveness are based upon grams-force per square centimeter (gf/cm$^2$) of the force needed to separate the surface 345 of a polished nickel cylinder 340 having a contact surface area of 1.76 cm$^2$ from the test sample 330.
2. Terminology
   2.1. As used herein, the term "adhesive-like" refers to having a sticky quality akin to an adhesive, but derives its sticky quality from molecular structure that forms a molecular attraction (e.g., rather than chemical bonded properties) which is releasable from adhered objects.
   2.2. As used herein, the term "tackiness" refers to the adhesiveness quality of feeling sticky to the touch.
   2.3. As used herein, the term "time dependent adhesive" refers to a material in which adhesive strength changes according to duration of the contact time with a contacting surface.
   2.4. As used herein, the term "pressure sensitive adhesives" refers to a material wherein additional external pressure is required to achieve a change in adhesiveness after initial contact.
3. Summary of Test Method Using the Testing Apparatus Depicted in FIG. 6
   3.1. A viscoelastomeric thermoset polymer 130 test sample 330 is placed upon the top side planar surface of the testing platform 360.
   3.2. The testing probe 350 of the apparatus 300 is lowered to place the surface 345 of the cylinder 340 onto the test sample 330.
   3.3. The surface 345 of the cylinder 340 of the apparatus 300 remains in contact with the polymer 130 test sample 330 for a designated time period.
   3.4. The cylinder 340 of the apparatus 300 is then raised from the test sample 330 via the reciprocating probe 350 at a constant speed of 2.7 cm/sec to measure the force in grams required to completely separate the cylinder surface 345 from the test sample 330, as indicated by the measuring scale 320.
   3.5. The measured separating force (adhesiveness) is then calculated and recorded in units of gf/cm$^2$. In addition, the contacting surface 345 of the cylinder 340 is observed and the amount (e.g., the weight) of residue attached thereto (if any) is recorded to determine cohesiveness. (Note: the surface 345 should be cleaned if residue is present prior to further testing.)

3.6. Steps 3.1-3.5 are then repeated on untested portions of the sample 330 so as to obtain a total of ten (10) tests per sample, which are then averaged to yield a final result.

3.7. Optionally, steps 3.1-3.6 can then be repeated over designated contact time intervals so as to determine the time dependent properties of the test sample 330.

3.8. Optionally, steps 3.1-3.6 can then be repeated over designated applied pressures so as to determine the pressure dependent properties of the test sample 730.

4. Apparatus 4.1. The testing apparatus 300 is illustrated in FIG. 6. Alternative materials and configurations to those stipulated may be utilized as long as they achieve comparable performance and meet the performance stipulations outlined in Section 4.2 below. Key elements of the apparatus include:

4.1.1. A reciprocating mobile actuator 350, which is responsible for lowering and raising the cylinder 340 onto the material sample 330 at a constant speed of 2.7 cm/sec.

4.1.2. The scale 320, which measures the amount of force in grams required to separate the contact surface 345 of the cylinder 340 from the test sample 330.

4.1.3. The contact surface 345 of the cylinder 340, which is the sole contacting surface with the test sample 330. The contact surface 345 of the cylinder 340 is a circular polished nickel surface having a total contact surface area of 1.76 cm$^2$.

4.1.4. The testing platform 360, which provides a solid, level surface for accurate test results and secures the adhesive polymer 130 test sample 330 for testing. This platform 360 is laterally movable so as to allow for repositioning of the test sample 330 for multiple testing.

4.2. Regardless of the specific components used:

4.2.1. The mobile actuator (test probe) 350 must raise and lower the cylinder 340 at a constant speed of 2.70 cm/second.

4.2.2. The accuracy of the test, the testing apparatus 300 and scale 320 must measure force in grams with an accuracy resolution of five-percent (5%) or better.

4.2.3. Except for optional pressure applied tests, a constant pressure of 20.0 grams for the duration of the test must be applied by the free-hanging, weighted cylinder 340.

4.3. The test procedure is conducted at ambient temperatures of 18° C. to 24° C. and most preferably at 21° C.

5. Calibration 5.1. Prior to first use and at subsequent reasonable testing intervals afterwards, the speed rate of the actuator 350 is verified (and adjusted as needed) to ensure consistency within the standard outlined in Section 4.2.1.

5.2. Prior to first use, the accuracy of the scale 320 should be verified against a known weight and adjusted or zeroed accordingly.

6. Procedure 6.1. Assemble the testing apparatus 300.

6.2. Place a polymer 130 test sample 330 of material to be tested upon the top side planar surface of the testing platform 360, ensuring that the platform 360 does not lift free during testing.

6.3. Lower the testing cylinder 340 onto the test sample 330, ensuring even contact between the contact surface 345 and the test sample 330, and ensuring the testing scale 350 is neither pulling nor applying pressure to the cylinder 340.

6.4. Allow the surface 345 of the cylinder 340 to remain in contact with the test sample 330 for 15 seconds or for the duration of another predetermined contact period.

6.5. Continue the test by raising the surface 345 of the cylinder 340 from the test sample 330.

6.6. Record the amount of grams-force as measured by the scale 350 needed to separate the surface 345 of the cylinder 340 from the test sample 330.

6.7. Clean the surface 345 of the cylinder 340 after each iteration with a lint free cloth.

6.8. Reset the scale 350.

6.9. Reposition the testing platform 360 such that a fresh (untested) area of the test sample 330 is tested by the apparatus 300.

6.10. Repeat steps 6.2-6.9 to obtain a total of ten (10) measurements.

6.11. Optionally repeat steps 6.2-6.10 for each duration of testing to determine time dependent properties (e.g., at timed intervals 15 seconds, 30 seconds, 5 minutes, 10 minutes and 15 minutes).

6.12. Optionally repeat steps 6.2-6.10 for each duration of testing to determine pressure dependent properties (by applying incremental predetermined pressures to the cylinder 340).

7. Calculation and Interpretation of Results 7.1. Calculate the adhesiveness for each of the ten (10) test sample 330 measurements by dividing the force (gf) required for the surface 345 of the cylinder 340 to completely detach from the test sample 330 by the contact surface area 345 of the cylinder 740 (1.76 cm$^2$), and then calculate the average of the ten (10) adhesiveness measurements to establish a final adhesiveness value. The average tested value is given in the amount of grams-force per square centimeter (gf/cm$^2$) representing the required force to separate the surface 345 of the cylinder 340 from the polymer 130 test sample 330, which serves as a measurement of adhesiveness.

7.2. Calculate the cohesiveness for each of the ten (10) observed residue quantities, and then calculate the average of the ten (10) quantities to establish a final cohesiveness value. A lower cohesiveness value can be more desirable than a higher value (e.g., wherein a lower value indicates less residue transferred to the contacting surface 345 of the cylinder 340 (i.e., better cohesiveness) than a higher value).

7.3. Repeat steps 7.1 and 7.2 for all iterations tested.

Time Sensitivity Test

An uncured admixture (such as prepared in accordance with Example 1 below) is spread evenly at a uniform four (4) mm thickness upon a polyvinyl chloride (PVC) apron and allowed to cure into a desired thermoset viscoelastomeric polymer 130. The resulting polymer 130 is then cut into suitable test sample 330 sizes for testing using the testing apparatus 300 depicted in FIG. 6, with the testing procedure being conducted in accordance with the Adhesiveness & Cohesiveness Test procedure set forth above, and further performing the optional time dependent properties procedures set forth therein.

Peel Test

Adhesiveness, cohesiveness and releasability properties can be measured using the test method described in Appendix A of the aforementioned cross-referenced related applications. Such properties can also be measured using standardized test methods known to persons having skill in the art, such as ASTM D1876 Peel Resistance of Adhesives (T-Peel Test), as well as other standardized Peel Tests such as the ASTM 90-Degree Test and ASTM 180-Degree Test, which are used when a flexible material has been bonded to a rigid substrate such as plastic or metal, as well as equivalent tests thereof.

Definitions

It should be noted that, when employed in the present disclosure, the terms "a" and "an" are intended to mean "at least one" of any stated features, elements, integers, steps, components, or groups and are not intended to be limited to only one of such features, elements, integers, steps, components, or groups thereof, except where specifically stated as such. In addition, use of the phrase "at least one" is not intended to render other uses of the terms "a" or "an" to be limited to only one of a feature, element, integer, step, component, or group.

It should be noted that, when employed in the present disclosure, the terms "comprises," "comprising" and other derivatives from the root term "comprise" are intended to be open ended terms that specify the presence of any stated features, elements, integers, steps, components, or groups, and are not intended to preclude the presence or addition of one or more other features, elements, integers, steps, components, or groups thereof.

As used herein, the terms "adhesive" and "adhesiveness" refer to the bonding strength or adhesive release strength of the viscoelastomeric thermoset polymer of the present disclosure and products thereof to an object. The polymer possesses an unexpectedly powerful adhesiveness from which an item can be released by applying a counteracting force to overcome the polymer's adhesiveness. Adhesiveness can be measured, inter alia, by the Adhesiveness and Cohesiveness Test set forth herein.

As used herein, the term "catalytic amount" is a term of the art which is recognized by persons having ordinary skill in the art and refers to an amount that is enough to obtain a desired response or result.

As used herein, the terms "cohesive" and "cohesiveness" refer to the ability of the viscoelastomeric thermoset polymer of the present disclosure and products thereof to retain its structural integrity when subjected to separating or peeling forces. Cohesiveness can be measured, inter alia, by the Adhesiveness & Cohesiveness Test set forth herein. The cohesive attributes can be further reflected by the separation of an item attached to the polymer component without leaving substantially any polymeric residue upon the surface of the item and by the polymer component's ability to return to its original innate form upon removal of an object attached thereto as prior to attachment of the item.

As used herein, the term "reaction media" refers to a mixture of chemical constituents which, upon curing, forms the polymer of the present disclosure.

As used herein with respect to the polymer of the present disclosure and products thereof, the terms "releasable" and "releasability" refer to the setting free from restraint or disengagement of an object from the polymer component.

As used herein, the terms "viscoelastomeric" and "viscoelastic" can be used interchangeably to refer to a substance having viscous, elastic and flow properties.

These terms may be defined with additional language in the remaining portions of the specification.

DETAILED DESCRIPTION

The invention is generally directed to a sectionalized containment combination. In some embodiments, the inventive sectionalized containment combination comprises a base or support member, an adhesive, cohesive and releasable viscoelastomeric thermoset polymer and a divider member. In further embodiments, the polymer is reusable. The invention can be useful for segregating items, preferably stowable items, as well as for stabilizing the items in contact with the polymer component such that items are substantially prevented from movement until intentionally removed by a user (via exerting a sufficient counteracting removal force to an item).

Although several exemplary embodiments of the present invention will be described herein, it should be understood that the disclosed embodiments are intended merely as non-limiting examples of the invention that may be embodied in various forms. Therefore, specific details disclosed herein, such as relating to structure, function, and the like, are not to be interpreted as limiting in any manner whatsoever, but rather only as one of numerous example bases for claims and/or teaching persons having ordinary skill in the art to variously employ the present invention in virtually any appropriately detailed structure or circumstance.

Accordingly, in the interest of brevity and conciseness, descriptions herein may be substantially directed to the non-limiting exemplary form of an inventive sectionalized containment combination comprising a support member in the form of a container or unconfined member, an adhesive, cohesive and releasable viscoelastomeric thermoset polymer in the form of a layer, and at least one free-standing divider member.

To gain a better understanding of the present invention, attention is directed to FIGS. 1-6 for exemplary purposes. In general, the inventive sectionalized containment combinations 100 of the present disclosure comprise a support member 110, a free-standing divider member 120 and a releasably adhesive viscoelastomeric thermoset polymer 130.

Figure 2:
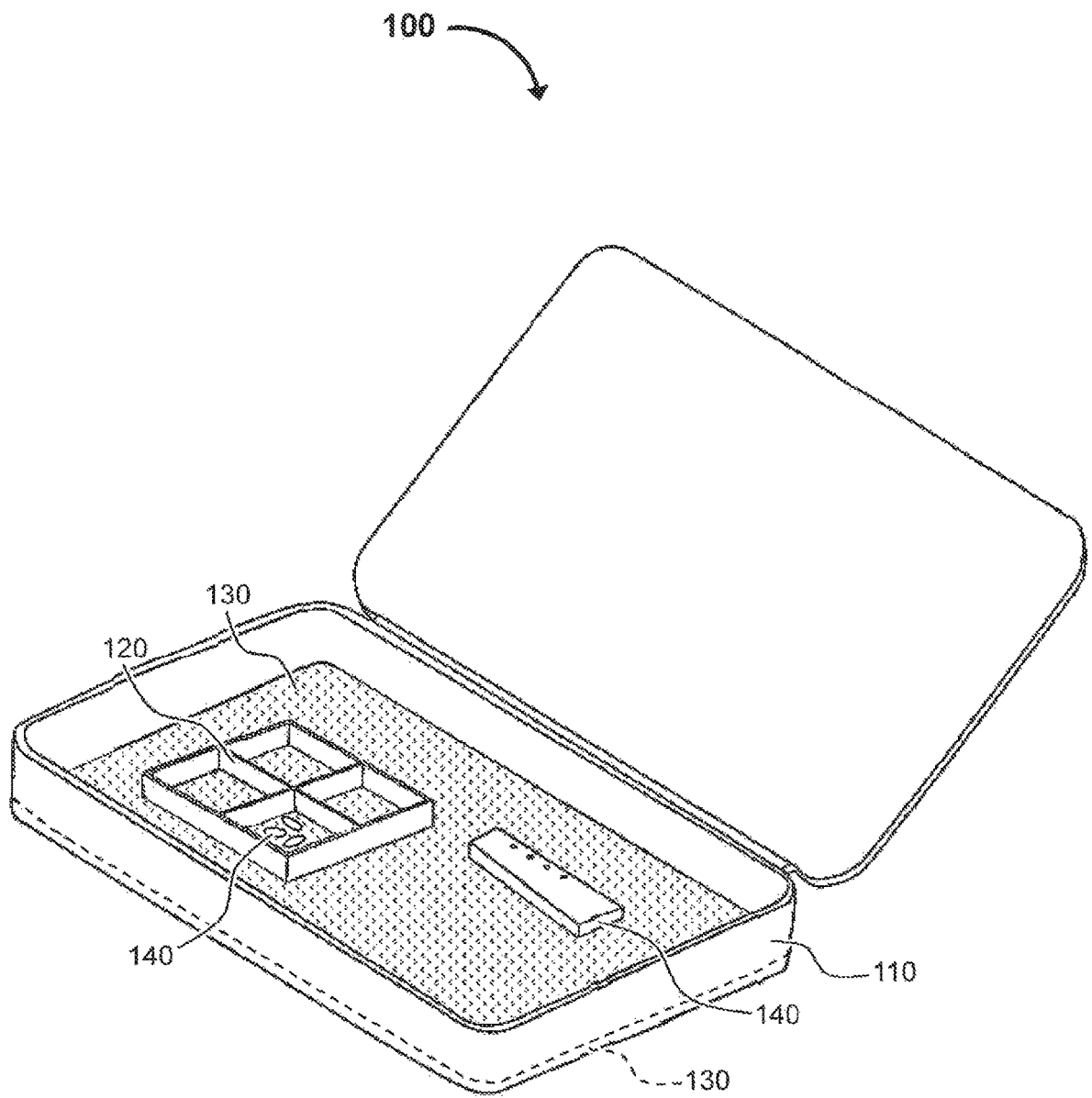
FIG. 2 is a perspective view showing a non-limiting exemplary embodiment of an inventive sectionalized containment combination of the present disclosure comprising a free-standing repositionable divider member in the form of a grid and a plurality of stowable items disposed upon a layer of polymer, which is disposed upon a support member in the form of a container.
Figure 3A:
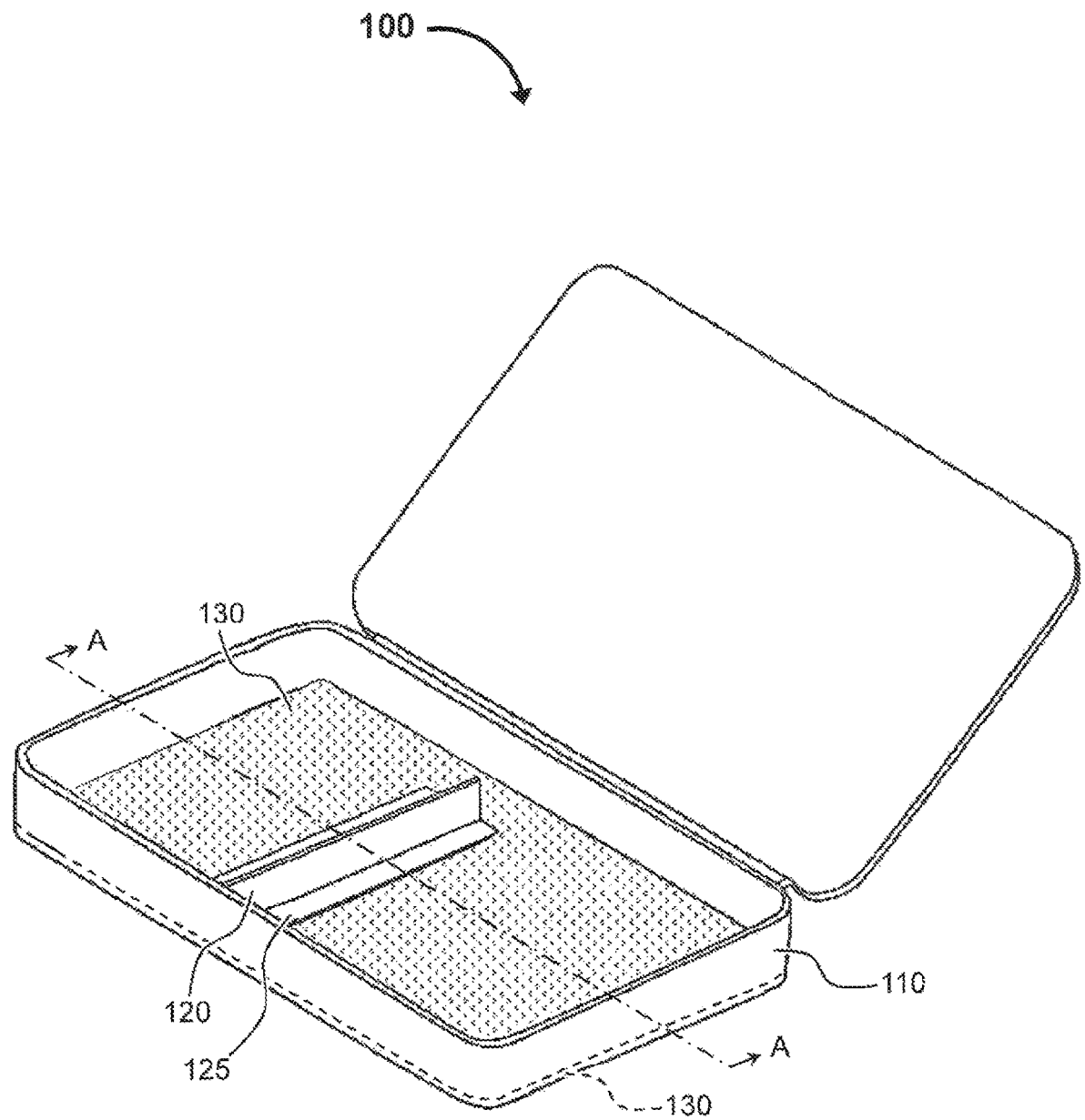
FIG. 3A is a perspective view showing a non-limiting exemplary embodiment of an inventive sectionalized containment combination of the present disclosure comprising a free-standing repositionable divider member in the form of a rail comprising an optional base element disposed upon a layer of polymer, which is disposed upon a support member in the form of a container.
Figure 3B:
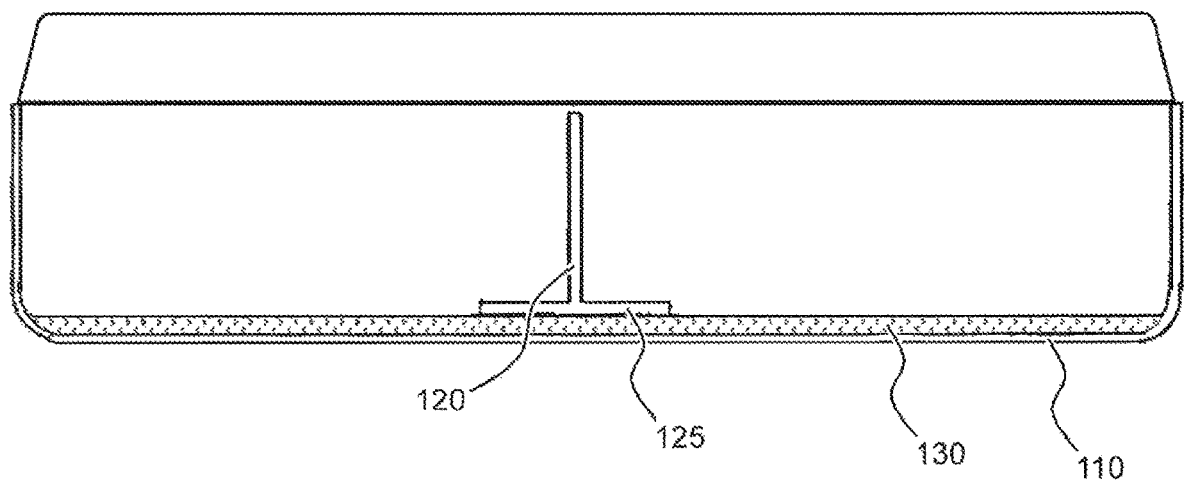
FIG. 3B is a cross-sectional side view of the inventive sectionalized containment combination of FIG. 3A taken along line A-A.
Figure 4:
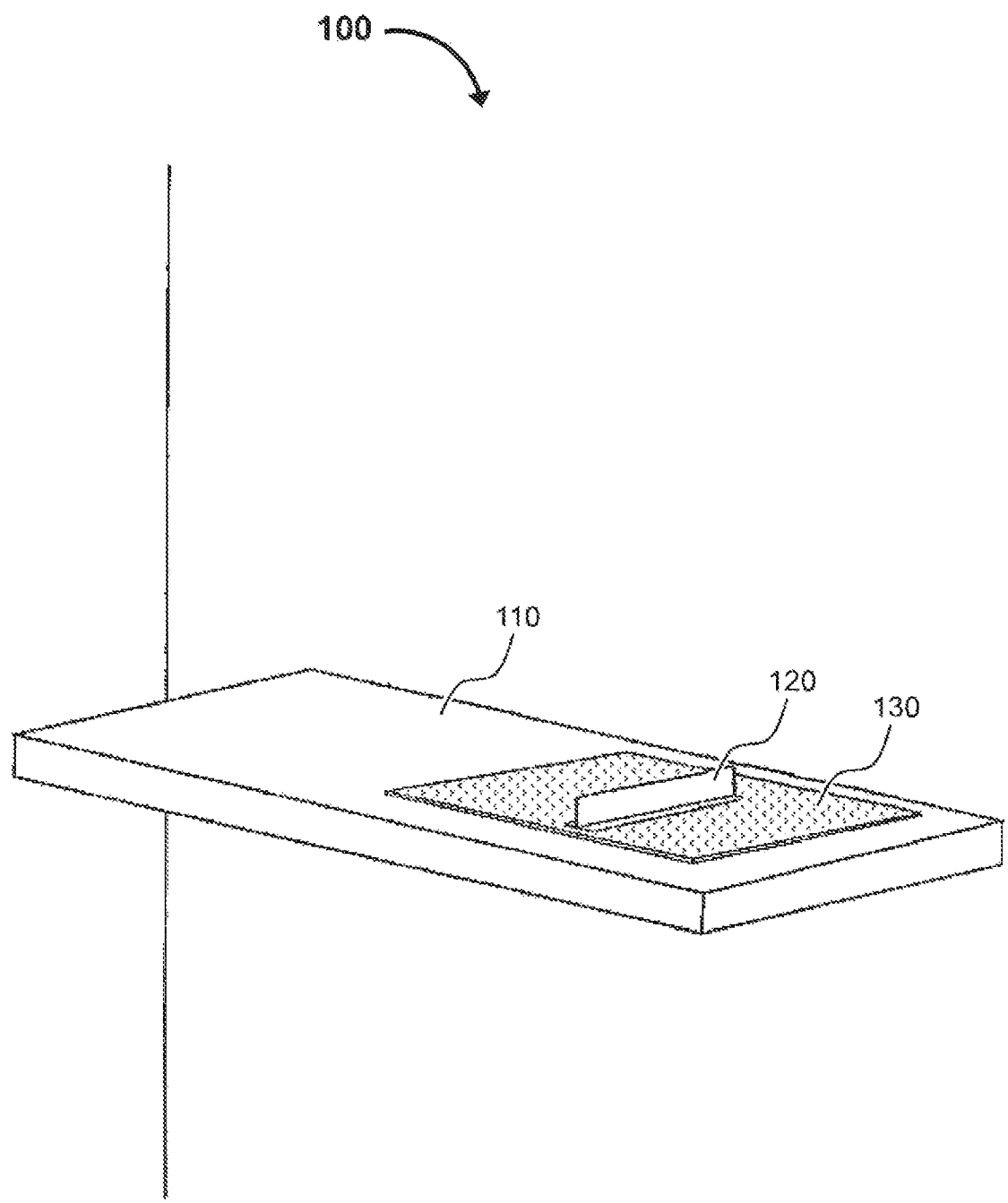
FIG. 4 is a perspective view showing a non-limiting exemplary embodiment of an inventive sectionalized containment combination of the present disclosure comprising a free-standing repositionable divider member in the form of a rail disposed upon a layer of polymer, which is disposed upon a support member in the form of a shelf which is generally horizontally mounted to a wall.

The support member 110 can provide the overall structural support for the inventive sectionalized containment combination 100. For example, as shown in FIGS. 1-3B, the support member 110 can resemble a traditional rectangular container, which may or may not comprise an optional lid. Such embodiments typically comprise vertically configured confining sidewalls around the perimeter of the support member 110 which principally define the containment area thereof. In conventional sectionalized containers, such sidewalls are essential in that they prevent items 140 from spilling out of the conventional containers, and can also provide a surface for anchoring structures to which divider members can be fixedly fastened. In contrast to conventional sectionalized containers, the inventive sectionalized containment combinations 100 of the present disclosure do not require such sidewalls (i.e., sidewalls are optional) since the confinement area is primarily defined by the polymer 130 component, and the free-standing divider member 120 and any items 140 to be stowed are adhered to the polymer 130 component. For example, FIGS. 4-5 show non-limiting exemplary embodiments of the inventive sectionalized containment combinations 100 which do not have sidewalls. In other words, the inventive sectionalized containment combination 100 of the present disclosure can transform a relatively planar member (e.g., a shelf, a plaque, a board, etc.) into a sectionalized container herein. In further contrast to conventional sectionalized containers, the inventive sectionalized containment combinations 100 of the present disclosure can be jarred, impacted, rotated vertically (see e.g., FIG. 5), or even turned upside-down (i.e., rotated 180°)

and any items 140 in contact with the polymer 130 component will remain in their emplaced position (i.e., stabilized against movement).

While FIGS. 1-5 show a support member 110 having a generally rectangular shape profile, it should be understood that the support member 110 can have any desired shape profile (e.g., rectangular, square, trapezoidal, triangular, circular, oval, pattern, random, etc.) without departing from the scope of the invention, and can be appropriately sized to accommodate a particular item 140 or array of items intended to be adhered to the sectionalized containment combination 100. In addition, the surface of the support member 110 upon which the polymer 130 component is applied can be relative flat, patterned, curved, angled, or have a random topography without departing from the scope of the invention. Accordingly, the support member 110 can have a thickness which may be uniform or non-uniform. There is no particular limit to the thickness of the support member 110, provided that the support member 110 allows the sectionalized containment combination 100 to perform as intended by the user. For example, in one non-limiting exemplary embodiment, the support member 110 can have a thickness of less than about 100 mm, such as about 1 mm to about 50 mm, or about 5 mm to about 10 mm. However, the support member 110 can have a thickness that is less than about 1 mm or greater than about 100 mm without departing from the scope of the invention.

The support member 110 can be rigid or flexible without departing from the scope of the invention. In addition, the support member 110 can comprise any suitable natural or synthetic material useful in providing a support structure for the sectionalized containment combinations 100. For example, the support member 110 can comprise metal, wood, glass, ceramic, foams, plastics (e.g., polyethylene, polypropylene, polyacrylates, etc.), polyesters, nylon, leather, fiberglass, polystyrene, rubber, and a host of other such natural and/or synthetic materials which can suitably support the thermoset viscoelastomeric polymer 130, the free-standing divider member 120 and any items 140 to be stowed.

Desirably, the surface of the support member 110 upon which the thermoset viscoelastomeric polymer 130 is disposed will have an overall attachment affinity to the polymer 130 which is greater than the adhesive affinity of the polymer 130 to the free-standing divider member 120 and an item 140 intended to be attached to thereto, in order to prevent detachment of the polymer 130 component from the support member 110 upon removal of the divider member 120 and/or item 140 from the sectionalized containment combination 100. This is typically accomplished by virtue of the overall contact area between the support member 110 and the polymer 130 component being greater than the overall area between the divider member 120 and/or item 140 and the polymer 130. Alternatively, the support member 110 can have a relatively lower adhesive affinity towards the polymer 130 (as compared to the divider member 120 and any items 140 to be attached), provided however that the surface of the support member 110 comprises suitable anchoring sites or is porous such that the resultant overall attachment force between the support member 110 and the polymer 130 component is greater than the adhesive force between the divider member 120 and/or item 140 and the polymer 130. Persons having ordinary skill in the art will recognize that the precise attachment force between the support member 110 and the polymer 130 component will vary depending upon numerous factors, such as the properties of the support member 110 and the polymer 130, for example. Accordingly, a support member 110 material wherein the overall attachment force of the polymer 130 thereto is less than the overall adhesive force of a divider member 120 and/or an intended item 140 to the polymer 130 component would generally not be a suitable material for providing the support member 110 component of the inventive sectionalized containment combination 100.

In general, the thermoset viscoelastomeric polymer 130 component may be appropriately sized to accommodate a particular support member 110 and/or an item 140 or array of items. For example, the polymer 130 component can have any desired shape profile (e.g., rectangular, square, trapezoidal, triangular, circular, oval, random, etc.), and may desirably have a similar shape to the support member 110, though it need not be. Likewise, the dimensions of the polymer 130 component will typically be equal to or less than the dimensions of the support member 110. However, the dimensions of the polymer 130 component can also be greater than the dimensions of the support member 110 (in one or more dimensions) without departing from the scope of the invention. In addition, the support member 110 can comprise a single polymer 130 component or multiple polymer 130 components without departing from the scope of the invention.

Figure 1:
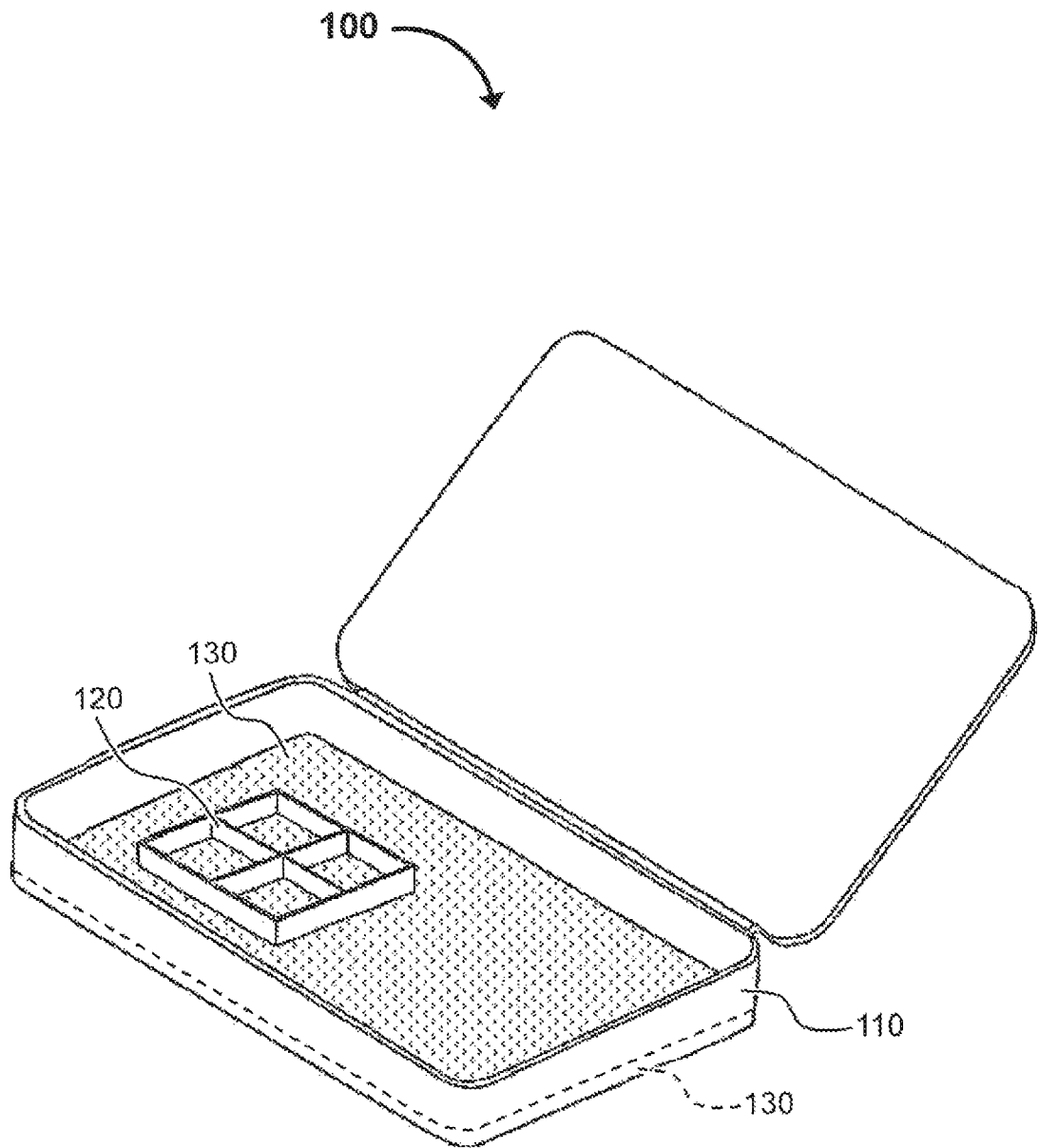
FIG. 1 is perspective view showing a non-limiting exemplary embodiment of an inventive sectionalized containment combination of the present disclosure comprising a free-standing repositionable divider member in the form of a grid disposed upon a layer of polymer, which is disposed upon a support member in the form of a container.

As referenced above, the inventive sectionalized containment combination 100 of the present disclosure also comprises a divider member 120, preferably a free-standing divider member. The purpose of the divider member 120 is to provide for the separation or division of stowable space such that items 140 can be segregated. The divider member 120 can have any functional shape profile as would be recognized by persons having ordinary skill in the art without departing from the scope of the invention. For example, as shown in FIG. 5, the divider member 120 can comprise an elongated bar-like structure. In another example, as shown in FIGS. 3A-4, the divider member 120 can comprise an elongated rail-like structure, which may or may not comprise an optional base element 125. In still another example, as shown in FIGS. 1-2, the divider member 120 can comprise a grid-like structure. Regardless of the particular shape profile, the divider member 120 is disposed upon and releasably adhered to the polymer 130 component. Accordingly, the sectionalized containment combination 100 relies upon the adhesive polymer 130 to adhesively engage and restrain a containment divider member 120 at any desired dividing containment position. In addition, the divider member 120 of the present invention can be uniquely removed from the sectionalized containment combination 100 and repositioned upon the polymer 130 component in any desired configuration as the need or desire arises. It should be noted that in the present invention (in contrast to conventional sectionalized containers), no sidewalls or anchoring mechanisms (other than the polymer 130 component) are required in order to engage a divider member 120 to the inventive sectionalized containment combination 100.

As referenced above, in some embodiments, it may be desirable that a divider member 120 include an optional base element 125 to provide additional surface area for adhesive engagement onto the adhesive polymer 130 to help maintain the divider member 120 in a desired containment position. Accordingly, a divider member 120 of such embodiments can have an inverted "T" shape (see e.g., FIGS. 3A-4) or an "L" shape. In other embodiments, the free-standing divider member 120 can comprise an "A" shape, an inverted "V" shape, an inverted "U" shape, and the like, without departing from the scope of the invention.

The divider member 120 may be of any size and configuration suitable in support of a free-standing divider member 120 when used in combination with the adhesive, cohesive and releasable viscoelastomeric thermoset polymer 130. The polymer 130 will significantly contribute to maintaining the divider member 120 in an upright position. For ease of use and stability, the divider member 120 can comprise an optional base element 125 having a greater horizontal width than the vertical portion of the divider member 120, though it need not be. If the free-standing divider member 120 possesses sufficient surface area to maintain the divider member 120 in an upright position when adhesively engaged to the polymer 130, then it will be generally useful herein as a free-standing divider member 120. In some embodiments, the divider member 120 can have a generally contiguous shape profile. In other embodiments, the divider member 120 can have a gridded shape profile which provides multiple compartments. Such a gridded divider member 120 may include dividing sections sized to separately house a particular item 140. Any other suitable shape profile of the divider member 120 can also be utilized without departing from the scope of the invention. Regardless of the shape profile, the free-standing divider member 120 can be released from the releasably adhesive polymer 130 and positionally relocated to any desired position upon the polymer 130, whereinafter the polymer 130 adhesively adheres the divider member 120 in an upright position, and also stabilizes the divider member 120 from further movement.

The free-standing divider member 120 may be rigid or flexible without departing from the scope of the invention, provided that any such flexible divider member 120 possesses sufficient rigidity to maintain a generally upright position when in use. In addition, the contacting surface of the divider member 120 (i.e., the surface in contact with the adhesive polymer 130) can be generally flat or can comprise multiple contacting support points. Suitable materials for constructing the free-standing divider member 120 can include, but are not limited to, thermoplastics (e.g. polyethylene, polypropylene, polystyrene, polyacrylates, etc.), rigid thermosets, pliable thermosets (e.g. natural rubber, synthetic rubber, etc.), metal, glass, fiberglass, ceramic, wood, and the like, and combinations thereof.

As referenced above, the inventive sectionalized containment combination 100 of the present disclosure also comprises an adhesive and cohesive viscoelastomeric thermoset polymer 130. The viscoelastomeric thermoset polymer 130 component of the inventive sectionalized containment combination 100 preferably possesses sufficient adhesiveness to adhesively engage and maintain the free-standing divider member 120 at a fixed position while also possessing sufficient cohesiveness and releasability properties to allow for the removal and repositioning of the divider member 120. Thus, one advantage of the inventive sectionalized containment combination 100 resides in its unique usefulness to accommodate for the particular size and/or quantity of stowed items 140 while also maintaining and stabilizing the items 140 in a desired sorted or segregated stowing position. Typically, the adhesiveness of the polymer 130 will be at least about 100 grams force per square centimeter ($gf/cm^2$) as measured by the Adhesiveness and Cohesiveness Test, such as about 100 $gf/cm^2$ to about 2,500 $gf/cm^2$, or about 300 $gf/cm^2$ to about 1,000 $gf/cm^2$ for improved benefits. For most applications, it is desirable to maintain a balance between the adhesive strength of the polymer 130 and the ease of release from the polymer 130. For example, certain applications involving heavy stowed items will generally allow for a comparatively higher adhesiveness (e.g. about 1,000 $gf/cm^2$ or greater), whereas the adhesiveness for applications involving lighter or fragile items such as for household uses (e.g. kitchenware, small tools, jewelry, cosmetics, medications, etc.), sporting goods (e.g. ammunition, handguns, fishing tackle, golf tees, etc.), transportable items (e.g., small boxes, bags, pouches, coins, etc.) will typically fall within a comparatively lower adhesiveness (e.g., about 1,000 $gf/cm^2$ or less) which affords an easier releasability.

The polymer 130 will generally possess sufficient adhesiveness so as to maintain the free-standing divider member 120 and stowed item 140 at a desired stabilized stowed position, but also possess sufficient cohesiveness so that upon release from the polymer 130, the released item 140 and the released divider member 120 will each remain substantially free from residual polymer 130. Whether or not the polymer 130 possess the necessary prerequisite adhesive properties may readily observed by trial and error. The most suitable adhesive polymer 130 is generally characterized as being a thermoset, and more particularly those of a class of adhesive thermosets known as viscoelastomeric thermosets, and especially those compositionally cross-referenced in the related applications incorporated herein.

Suitable viscoelastomeric thermoset polymers 130 for use herein generally include those compositions possessing sufficient adhesiveness (to restrain the divider member 120 and stowed items 140 at a stabilized position) and cohesiveness (to release the divider member 120 and stowed items 140 while returning to its substantially intact form). In general, the adhesive polymer 130 will provide sufficient adhesiveness to interfacially restrain the divider member 120 at an emplaced location in a substantially upright position and prevent separation from the polymer 130 until a sufficient separating force (e.g. 100 $gf/cm^2$ or more) is applied to remove the divider member 120 from the polymer 130. The polymer 130 will generally provide sufficient adhesive stabilization to maintain the divider member 120 and stowed items 140 at an emplaced position while also allowing for an expeditious ease of their removal from the polymer 130. The adhesive polymer 130 is also designed to provide sufficient adhesiveness to restrain the divider member 120 against vertical and horizontal displacement even when subjected to relatively harsh impacting forces. By providing a polymer 130 having a desired releasable adhesiveness, both the divider member 120 and the adhered items 140 can be restrained and can subsequently be relatively effortlessly removed from the polymer 130 component of the inventive sectionalized containment combination 100. For most applications, the polymer 130 can suitably have an adhesiveness of about 100 $gf/cm^2$ to about 2,500 $gf/cm^2$ as measured by the Adhesiveness and Cohesiveness Test, such as bout 200 $gf/cm^2$ to about 1,500 $gf/cm^2$, or about 300 $gf/cm^2$ to about 1,000 $gf/cm^2$, for improved benefits.

Although any adhesive thermoset polymer generally embraces those adhesives meeting the aforementioned adhesiveness, cohesiveness and releasability properties, a particularly effective adhesive polymer 130 may be derived from a thermosetting reaction media which, upon curing, yields a thermoset viscoelastomer possessing the desired cohesiveness and adhesiveness for use herein. Exemplary of such viscoelastomeric thermosets possessing the desired properties for use herein include those disclosed in co-pending Nonprovisional patent application Ser. No. 15/731,815 to Kriesel et al. entitled Adhesive Viscoelastomer and Its Use in Stabilized Storage Containers and co-pending Nonprovisional patent application Ser. No. 17/460,196 to Kriesel et al. entitled Thermoset Viscoelastomeric Polymer and Products Thereof, the contents of which are incorporated herein by reference in a manner that is consistent herewith. Such a unique cohesive and adhesive viscoelastomeric thermoset polymerizate may be derived from a reaction media of a carefully balanced ratio of polyols (e.g. straight chain diols and crosslinking polyols) and isocyanates to provide a properly configured carbamate thermoset linkage or infrastructure for effectively housing a relatively high loading of plasticizers (i.e., about 10 wt % or greater) so as to provide a thermoset reaction product possessing the unexpectedly unique viscoelastic, adhesiveness, cohesiveness and releasability properties especially suitable for use herein as a polymer 130. Such thermoset reaction media provides a unique polymeric infrastructure loaded with an effective level of plastic plasticizers to create a thermoset polymer possessing unexpectedly superior cohesiveness and adhesiveness for use as a containment combination 100 for the divider member 120 and the stowed items 140. The adhesiveness of the resultant thermoset polymer 130 effectively restrains both the emplaced divider member 120 and stowed items 140 in a stabilized position until removed therefrom by a sufficient force to overcome the adhesive attraction between the divider member 120 and/or stowed items 140 and the polymer 130 component.

In some preferred embodiments, the adhesive viscoelastomeric thermoset polymer 130 may be derived from a thermosetting reaction media comprised of a substantially uniform admixture of an isocyanate prepolymer, prescribed amounts of polyols (e.g., polyether diols and polyether triols) and a carefully controlled amount of select plasticizers. The isocyanate prepolymer in combination with a controlled amount of polyols in the form of straight chain diols and crosslinking polyols (preferably crosslinking triols) provides a thermoset infrastructure for effectively housing the plasticizing components in a form which unexpectedly contributes to the unique stabilizing, viscoelastic, adhesive, cohesive and releasability attributes, while also permitting an unexpected restorative cleansability function via conventional washing (e.g., with water or a soap and water solution) and/or autoclaving techniques. Accordingly, the unexpected cohesiveness attributes of the polymer 130 substantially prevent plasticizer leakage from the polymer 130, which solves a long-standing problem of existing polymers having high plasticizer loadings (i.e., greater than about 10 wt % of the total reaction media weight).

As referenced above, a highly effective thermosetting reaction media for preparing the adhesive polymer 130 of the present disclosure comprises a prepolymer, polyols and plasticizer. More particularly, the reaction media comprises (i) a prepolymer, such as an isocyanate prepolymer (e.g., a polyol reacted with an isocyanate), preferably a diisocyanate prepolymer (e.g., methylene diphenyl diisocyanate (MDI)), ranging from about 2 wt % to about 10 wt % of the total reaction media weight; (ii) polyols, ranging from about 35 wt % to about 75 wt % of the total reaction media weight, wherein the polyols include straight chain linking polyols (preferably diols) and crosslinking polyols (preferably triols); and (iii) plasticizer, ranging from about 10 wt % to about 60 wt % of the total reaction media weight, wherein the plasticizer includes an epoxidized triglyceride plasticizer in an amount of about 10 wt % to less than about 50 wt % of the total reaction media weight, such as about 10 wt % to about 45 wt % of the total reaction media weight, or about 10 wt % to less than 45 wt % of the total reaction media weight to provide improved benefits, and optionally a reaction media viscosity-reducing plasticizer, preferably an ester plasticizer, in an amount of about 0 wt % to about 40 wt % of the total reaction media weight. The thermoset viscoelastomeric polymer 130 can also optionally comprise additional components including, but not limited to, additional plasticizers, catalysts, initiators, colorants (e.g., dyes), UV inhibitors, antioxidants, and the like, as would be known to persons having ordinary skill in the art, without departing from the scope of the invention. It has been observed herein that the weight of the reaction media and the weight of the resulting reaction product (i.e., the polymer 130) remains substantially equivalent upon mixing and curing the reaction media; thus, the compositional amount (i.e., wt %) of each constituent may be expressed in terms of "wt % by weight of the polymer" without departing from the scope of the invention.

The thermosetting reaction media (and thus the resulting adhesive polymer 130) comprises a quantity of prepolymer which forms the backbone of the polymer 130. Such prepolymer will typically be present in an amount of about 2 wt % to about 10 wt % of the total reaction media weight, such as about 3 wt % to about 9 wt %, or about 4 wt % to about 8 wt % of the total reaction media weight to provide improved benefits. Suitable prepolymers can include a ring-opening species of a hardener (e.g., amines, amides, mercaptans, anhydrides, isocyanates including polyisocyanates (such as a diisocyanate), etc.). Suitable polyisocyanates include, but are not limited to, aromatic diisocyanates (e.g., diphenylmethane diisocyanate, methylene diphenyl diisocyanate (MDI), toluene diisocyanate (TDI), etc.) and aliphatic diisocyanates (e.g., hexamethylene diisocyanate (HDI), isophorone diisocyanate (IPDI), etc.) in a conventional prepolymer form. In one non-limiting example, a methylene diphenyl diisocyanate (MDI) designated as ELASTOCAST TQZ-P23, available from BASF Corporation, having a place of business located in Florham Park, N.J., USA, can provide a suitable prepolymer to form the adhesive thermoset viscoelastomeric polymer 130 of the present disclosure.

The thermosetting reaction media (and thus the resulting adhesive polymer 130) also comprises a quantity of polyols, typically ranging from about 35 wt % to about 75 wt % of the total reaction media weight, such as about 38 wt % to about 65 wt %, or about 40 wt % to about 55 wt % of the total reaction media weight, to provide improved benefits. More particularly, the polyols include straight chain polyols and crosslinking polyols. In some desirable aspects, the straight chain polyols can be in the form of diols (e.g., a diol having two terminal reactive groups), and the crosslinking polyols can be in the form of triols (e.g., having two terminal reactive groups and one additional reactive group). The diol and triol components of the reaction media are typically liquid at room temperature (i.e., about 21° C.) and generally have a molecular weight of about 1,000 to about 20,000, such as about 1,000 to about 15,000, or about 1,000 to about 10,000, to provide improved benefits. The adhesiveness, cohesiveness and releasability of the resulting polymer 130 depend upon using a controlled polyol balance within the thermosetting reaction media. It has been discovered herein that the amount of diols and triols (preferably reacted in the presence of an effective amount of plasticizer within the reaction media) can suitably fall within a prescribed diol to triol weight ratio of about 1:3 to about 3:1, such as about 1:2 to 2:1, or about 7:13 to about 13:7, to provide the desired viscoelastic, adhesive, cohesive, releasability, cleansability, and/or unexpected antipathogenic attributes for effective use herein (while also inhibiting bleeding of plasticizer from the polymer 130). The content and type of polyols can have a pronounced effect upon imparting the necessary thermoset polymeric infrastructure for obtaining the polymer 130 attributes herein. Accordingly, it has been discovered herein that when the weight ratio of diols to triols deviates outside a range of about 1:3 to about 3:1, the desired adhesiveness, cohesiveness and releasability attributes of the resultant polymer 130 will begin to diminish. Thus, a controlled balance within the cited ranges with respect to the straight chain diols and the crosslinking triols can provide an effective reaction media for preparing a thermoset viscoelastomeric polymer 130 uniquely possessing the viscoelastic, adhesiveness, cohesiveness, releasability, cleansability, and antimicrobial features for the inventive sectionalized containment combinations 100 of the present disclosure. It has also been discovered herein that the resulting polymer 130 further possesses a resistance to melting when subjected to heat.

In general, the diol component of the thermoset viscoelastomeric polymer 130 can provide straight chain infrastructure formation and sufficient crosslinkage disruption to permit for a highly effective intermolecular plasticizer attraction and alignment, thus providing for an unusually high and effective loading of the viscoelastic, adhesive, cohesive and antipathogenic contributing plasticizer cofactors. In some preferred embodiments, the straight chain diol can be provided by a polyether diol having a molecular weight suitably ranging from about 1,000 to about 10,000, such as about 1,000 to about 8,000, or about 2,000 to about 6,000 for improved benefits, and preferably having two (2) terminal reactive groups (e.g., hydroxyl groups). Such polyether diol can be suitably present in an amount ranging from about 1 wt % to about 65 wt % of the total reaction media weight, such as about 5 wt % to about 55 wt %, or about 10 wt % to about 45 wt % of the total reaction media weight, to provide improved benefits. In one example, a 2-functional polyether diol, designated as ELASTOCAST C-4057, available from BASF Corporation, can provide a suitable diol component to form the thermoset viscoelastomeric polymer 130 of the present disclosure.

In general, the crosslinking polyol component of the thermoset viscoelastomeric polymer 130 can provide sufficient crosslinkage infrastructure to the polymer 130, and can contribute to the unexpected cohesiveness, releasability and stability (i.e., resistance to plasticizer bleeding) attributes thereof. In some preferred embodiments, the crosslinking polyol can be provided by a polyether triol having a molecular weight suitably ranging from about 1,000 to about 10,000, such as about 2,000 to about 8,000, or about 3,000 to about 7,000 for improved benefits, and preferably having three (3) reactive groups (e.g., hydroxyl groups) wherein two (2) of the reactive groups are terminal reactive groups. Such polyether triol can be suitably present in an amount ranging from about 3 wt % to about 50 wt % of the total reaction media weight, such as about 10 wt % to about 45 wt %, or about 20 wt % to about 40 wt % of the total reaction media weight, to provide improved benefits. In one example, a 3-functional polyether triol, designated as ELASTOCAST C-4018, available from BASF Corporation, can provide a suitable triol component to form the thermoset viscoelastomeric polymer 130 of the present disclosure.

The adhesiveness properties of the polymer 130 herein can be tailored to fit the need for any given free-standing divider member 120 and/or items 140 to be attached to the inventive sectionalized containment combination 100. Accordingly, the thermosetting reaction media may be properly formulated so as to impart a desired degree of adhesiveness for the adherence and stabilization of the divider member 120 and any given item 140 adhered thereto while still retaining the desired cohesiveness of the polymer 130. For example, in general, increasing the diol to triol ratio (i.e., increasing the diol content relative to the triol content) will result in an increased adhesiveness of the polymer 130. Conversely, decreasing the diol to triol ratio (i.e., increasing the triol content relative to the diol content) will generally result in an increased cohesiveness of the polymer 130. Thus, controlling the diol to triol weight ratio within the range of about 3:1 to about 1:3 for example can result in a polymer 130 having a desired adhesiveness and cohesiveness for the adhesion and subsequent release of the divider member 120 and/or any particular item 140.

The thermoset viscoelastomeric polymer 130 also comprises a quantity of plasticizers typically ranging from about 10 wt % to about 60 wt % of the total reaction media weight, such as about 15 wt % to about 55 wt %, or about 20 wt % to about 50 wt % of the total reaction media weight, to provide improved benefits. More particularly, the plasticizers include a triglyceride plasticizer, and can optionally further include a process aid plasticizer (i.e., a reaction media viscosity reducing plasticizer). In some preferred embodiments, the triglyceride plasticizer is an epoxidized triglyceride plasticizer, and the optional viscosity reducing plasticizer is an ester plasticizer. The plasticizer components of the thermoset reaction media are typically liquid at room temperature (i.e., about 21° C.). It has been discovered herein that the weight ratio of triglyceride plasticizer to viscosity reducing plasticizer can suitably fall within a prescribed weight ratio range of about 1:0 to about 1:1, such as about 6:1 to about 1:3, or about 3:1 to about 1:2, to provide a workable reaction media viscosity, and to help provide the desired viscoelastic, adhesiveness, cohesiveness and releasability attributes of the resulting polymer 130. The content and type of plasticizers can have a pronounced effect upon imparting the desired polymer 130 attributes herein. Thus, a controlled amount of triglyceride plasticizer (e.g., epoxidized triglyceride plasticizer) and optional viscosity reducing plasticizer (e.g., ester plasticizer) within the prescribed range can provide an effective reaction media for preparing a polymer 130 uniquely possessing the desired compositional attributes for use herein. Desirably, the plasticizer component is uniformly dispersed and cohesively bound throughout the thermosetting reaction media (along with the other polymerizable thermosetting components) and will tenaciously remain uniformly dispersed within the resultant viscoelastomeric thermoset polymer 130 in a highly cohesive and stabilized (i.e., resistance to plasticizer bleeding) form.

Suitable triglyceride plasticizers for preparing the thermoset viscoelastomeric polymer 130 desirably include epoxidized triglyceride plasticizers. Epoxidized triglyceride plasticizers, such as epoxidized animal oils and epoxidized vegetable oils, are particularly effective as a plasticizer component in the thermosetting viscoelastomeric reaction media herein. Amongst the suitable epoxidized triglyceride plasticizers, epoxidized vegetable oils (e.g., soybean, castor, corn, cottonseed, perilla, safflower, linseed, tall, etc.) have been found to be particularly effective triglyceride plasticizers herein. Other suitable triglyceride plasticizers have been more extensively described in the aforementioned cross-referenced related applications. Such triglyceride plasticizers can be suitably present in an amount that is less than about 50 wt % of the total reaction media weight, such as less than about 45 wt %, or about 10 wt % to less than 50 wt %, or about 10 wt % to less than 45 wt % of the total reaction media weight, to provide improved benefits. In one desirable example, epoxidized soybean oil can provide a highly suitable triglyceride plasticizer to form the adhesive polymer 130 of the present disclosure.

The thermoset viscoelastomeric polymer 130 can also optionally comprise a suitable reaction media viscosity reducing plasticizer. In general, those plasticizers which are suitable as plasticizing agents for the plasticization of polyvinyl chlorides can be utilized as viscosity reducing plasticizers for the reaction media herein. Exemplary viscosity reducing plasticizers for preparing the polymer 130 can include, but are not limited to, ester plasticizers. Such ester plasticizers are especially effective as an optional additional plasticizer component in the thermosetting reaction media. Suitable ester plasticizers typically have a relatively low molecular weight, typically less than about 750, or less than about 500, and can include, but are not limited to, the condensation products of alcohols (e.g., $C_1$-$C_{10}$ alcohols, such as $C_2$-$C_6$ alcohols) and dicarboxylic acids (e.g., $C_2$-$C_{12}$ dicarboxylic acids, such as $C_4$-$C_8$ dicarboxylic acids). In addition, amongst the more fluid ester plasticizers, such as diester plasticizers for example, are the lower dialkyl esters of dicarboxylic acids, such as dialkyl esters having alkyl groupings of less than 12 carbon atoms, such as $C_1$-$C_8$ dialkyl ester groupings of sebacates, adipates, phthalates, isophthalates, maleates, azelates, glutarates, etc., as well as 2,2,4-Trimethyl-1,3-pentanediol monoisobutyrate (TXIB), which have been found to be particularly effective ester plasticizers herein.

In some aspects, the polar strength (often referred to as "dipole moment") of such ester plasticizers depends, to a certain degree, upon the alcohol condensation reactant chain length, which can also help maintain the adhesiveness characteristics of the thermoset viscoelastomeric reaction product. For example, non-epoxidized plasticizers having a relatively high dipole moment (e.g., dibutyl sebacate, having a dipole moment of 2.48 Debyes (D), as compared to epoxidized plasticizers having a dipole moment near 0 D) can be effective in retaining the desired properties of the polymerizate while also providing a thermosetting reaction media exhibiting a reduced working viscosity, which is particularly effective for use in permeating porous interstices or fabric structures of a support member 110. Suitable ester plasticizers can have a dipole moment of greater than about 1.5 D, such as greater than about 2.0 D, to provide improved benefits. The ester plasticizers can be suitably present in an amount ranging from about 0 wt % to about 40 wt % of the total reaction media weight, such as about 1 wt % to about 30 wt %, or about 2 wt % to about 20 wt % of the total reaction media weight for improved benefits. In one non-limiting example, dibutyl sebacate can provide a highly suitable ester plasticizer to form the reaction media of the present disclosure. In another non-limiting example, 2,2,4-Trimethyl-1,3-pentanediol monoisobutyratecan (TXIB) can provide a highly suitable ester plasticizer to form the reaction media of the present disclosure.

In some aspects, the incorporation (within the ranges prescribed herein) of the relatively low molecular weight ester plasticizer in combination with the triglyceride plasticizer (e.g., epoxidized triglyceride plasticizer) can be utilized herein to provide an easier fabricating form (e.g., for casting, molding, injecting, pouring, spraying, printing, etc.) of the uncured polymer mix by lowering the viscosity of the reaction media without adversely affecting the desirable features of the viscoelastomeric thermoset polymer 130. For example, the addition of polar ester plasticizers, or substitution of the triglyceride plasticizers with polar ester plasticizers, has been found to effectively reduce the viscosity of the reaction media while still maintaining a desired level of adhesiveness and cohesiveness of the resulting polymer 130, as well as excellent releasability and stability properties. It has been discovered herein that including an ester plasticizer having a fluid consistency at room temperature (i.e., about 21° C.) and having a relatively low molecular weight (e.g., less than about 750) in the reaction media can contribute to ideal working viscosities during the initial curing stages, rendering the reaction media to be more effective for forming the inventive sectionalized containment combinations 100 of the present disclosure. Inclusion of an ester plasticizer can be particularly desirable where uncured reaction media is first applied to a support member 110 in a substantially liquid form, and then cured in situ, to form a tenacious bonding between the resulting polymer 130 and the support member 110.

As referenced above, the plasticizer component is desirably uniformly incorporated into the thermosetting reaction media (along with the other polymerizable thermosetting reactants) and will tenaciously remain uniformly dispersed within the resultant thermoset viscoelastomeric polymer 130 herein in a highly cohesive and stabilized form. The straight chain producing diols and crosslinking triols, in cooperative combination with the plasticizer, create a viscoelastomeric thermoset polymeric structure possessing a high degree of compositional adhesiveness and cohesiveness which is desirable to adhesively secure and retain a divider member 120 and/or an item 140, while also allowing for a clean cohesive separation of the divider member 120 and/or item 140 from the polymer 130 (upon application of a sufficient removal force which overcomes the adhesive force of the polymer 130), desirably leaving no visually detectable polymeric residue upon the divider member 120 or item 140. Controlling the reaction media weight ratio of triglyceride plasticizer and optional viscosity reducing plasticizer (along with the diol to triol weight ratios) accordingly constitutes an important consideration in preparing the reaction media for the thermoset viscoelastomeric polymer 130. For example, if the amount of plasticizer is excessively high (i.e., outside the range prescribed herein), the resultant polymer 130 will tend to lose its desired cohesiveness and will then tend to distort (i.e., may not return to its original innate form as when initially formed), and/or will tend to bleed plasticizer. However, it has been discovered herein that in certain instances, increasing the triol content can partially arrest such plasticizer bleeding, but such triol increase will then tend to decrease the adhesiveness of the polymer 130.

The unique bridged crosslinked polymeric structure of the thermoset polymerizate 130 obtained from an appropriate thermoset reaction media provides an ideal infrastructure for effectively harboring the plasticizer in an unexpectedly superior cohesive and adhesive form. Indeed, it appears that the disrupted crosslinked infrastructure and the polarity provided by the polymerized diols and triols orients the polarized plasticizer within the resulting polymer 130 so as to impart, inter alia, the unexpected viscoelastic, adhesiveness, cohesiveness, releasability and stability properties (as well as unexpected cleansability and antimicrobial properties) to the polymer 130 herein.

The thermoset viscoelastomeric polymer 130 can also optionally comprise additional constituents including, but not limited to, catalysts, initiators, other additional plasticizers, colorants, UV inhibitors, antioxidants, and the like, as would be known to persons having ordinary skill in the art, without departing from the scope of the invention. For example, the polymerization of the thermosetting reaction media can be carried out in the presence of a catalyzing amount (defined above) of a catalyst (e.g., a slow-acting catalyst or a heat-activated catalyst) to control the curing rate of the reaction media. Suitable catalysts can include tertiary amines, tertiary phosphines, strong bases (e.g., alkali, alkaline earth metal hydroxides, alkoxides, phenoxides, etc.), acidic metal salts of strong acids, metal chelates, metal alcoholates, metal phenolates, organic acid salts, organo metallic derivatives, etc. In one non-limiting example, a slow-acting organobismuth catalyst, available under the tradename COSCAT 83 (available from Vertellus Holdings LLC, having a place of business located in Zeeland, Mich., USA), can provide a suitable catalyst for controlling the curing rate of the thermosetting reaction media to form the inventive thermoset viscoelastomeric polymer 130. In another non-limiting example, a heat-activated tin thioglycolate catalyst, available under the tradename FOMREZ CATALYST UL-29 (available from Momentive Performance Materials Inc., having a place of business located in Wilton, Conn., USA), can provide a suitable catalyst for controlling the curing rate of the thermosetting reaction media to form the polymer 130 herein.

Procedurally, the reaction product which forms the viscoelastomeric thermoset polymer 130 can be prepared from a thermosetting reaction media homogeneously loaded with plasticizer(s) which includes a triglyceride plasticizer (preferably an epoxidized triglyceride plasticizer, such as epoxidized vegetable oil) as well as optionally any other effective polar plasticizer, coupled with a carefully measured amount of straight chain diols (to create the necessary bridging between the crosslinks) and crosslinking polyols, and an isocyanate prepolymer hardener (e.g., diisocyanate, such as aliphatic, aromatic, heterocyclic, etc., polyisocyanates, cycloaliphatic isocyanates and arylaliphatic isocyanates), and typically in the presence of an appropriate catalyst (e.g., preferably a relatively slow acting or heat-activated catalyst). The reaction media desirably contains the necessary plasticizer loading specifically adapted to provide a curable reaction media, which upon curing, produces a viscoelastomeric reaction product (i.e., polymer 130) having a unique polymerizate structure effectively loaded with polar oriented plasticizers uniformly and homogeneously distributed throughout the polymer's entire thermoset mass, intertwined therewithin, and supported by the flexible plasticizer-entrapping thermoset polymerizate structure. Under the most effective thermosetting and fabricating conditions, the thermosetting polymerizate reactants and the plasticizers are collectively provided in the reaction media as liquids at room temperature (i.e., about 21° C.) without necessitating the use of any solvents, other chemical dispersion aids or elevated temperatures, in order to homogeneously disperse the reaction media components. Accordingly, this allows the thermosetting reaction to be effectively conducted at room temperature.

The crosslinked polymeric structure of the adhesive polymer 130 herein obtained from an appropriate reaction media provides an ideal infrastructure for effectively harboring plasticizer components in an unexpectedly desirable viscoelastic, adhesive, cohesive, releasable and stabilized (i.e., substantially no plasticizer bleeding) polymeric form, while also providing unexpected antimicrobial properties and cleansability/reusability properties (which can restore adhesiveness), as well as a resistance to melting when subjected to heat. Desirably, the plasticizer is uniformly incorporated throughout the reaction media containing the polymerizable components, and remains uniformly dispersed within the resultant polymer 130 in a highly cohesive form, thus preventing leakage of the plasticizers therefrom. It appears that the crosslinked infrastructure and the polarity provided by the polymerized straight chain diols and crosslinking polyols (e.g., polyether diols and polyether triols) orients the polarized plasticizer components (e.g., epoxidized triglyceride plasticizer and optional viscosity reducing plasticizer) within the resulting polymer 130 to impart the unexpected viscoelastic, adhesiveness, cohesiveness, releasability, stability, cleansability, reusability and antimicrobial properties to the unique polymer 130 herein. Thus, the thermosetting diols and triols in cooperative combination with the plasticizer create a thermoset polymeric structure possessing a high degree of compositional adhesiveness and cohesiveness for effective usage with the inventive sectionalized containment combination 100 of the present disclosure, while also allowing for a clean cohesive separation from the support member 110 and/or a divider member 120 and/or an item 140 (i.e., leaving substantially no visible polymeric residue thereon) which is adhered to the resulting polymer 130 component.

From a molecular infrastructure standpoint, the unique combination of straight chain and crosslinking reactants and plasticizer types in the amounts prescribed herein creates a uniquely different and inventive polymer 130. The appropriate control of straight chain diol and crosslinking polyol reactants appears to create long chain polarized sites ideal for powerful cohesive polar entrapment of the plasticizer while also aligning the polarized plasticizer components in a powerful adhesive and cohesive positioning within the polymer 130. The polarized molecular alignment of the plasticizer cofactor within the polymeric infrastructure contributes to a highly cohesive structure which maintains its molecular integrity when subjected to forces which effect separation of the polymer 130 from a contacting surface of a divider member 120 and/or an item 140 (or removal of the polymer 130 component from the support member 110, such as for cleansing). The plasticizer appears to also be a major contributing factor in the polymer's unique viscoelastomeric properties. As a result, the polymer 130 herein possesses a host of unexpectedly unique and superior properties (e.g., adhesiveness, cohesiveness, releasability, stability, cleansability, reusability, antimicrobial, etc.) over conventional adhesive compositions currently available.

As referenced above, the thermosetting straight chain linking diols and crosslinking polyols (e.g., triols) in cooperative combination with the plasticizer create a polymer 130 having unexpected antimicrobial properties, as well as a thermoset viscoelastic polymeric structure possessing a high degree of compositional adhesiveness and cohesiveness necessary to adhesively secure and retain a divider member 120 and/or items 140, in addition to a clean cohesive separation from the surface of the divider member 120 and/or items 140. The type of plasticizers and reactants in controlled amounts (within the quantity ranges prescribed herein) can also be effectively utilized to provide desirable thermosetting fabrication conditions for preparing the polymer 130, and thereby providing an inventive sectionalized containment combination 100 possessing the unique attributes herein.

As a result of its unique chemical composition and processing conditions, the polymer 130 component of the inventive sectionalized containment combinations 100 herein possesses a host of unique and unexpected properties. For example, the polymer 130 exhibits advantageously unique viscoelastic properties. Due to its fluidic properties (as opposed to compression properties, such as found in foam or rubber compositions), such viscoelastic properties allow the polymer 130 to at least partially surround and conform to the configuration of a divider member 120 and/or an item 140 due to the weight of such divider member 120 and/or item 140, and/or the force exerted when a user places the divider member 120 and/or item 140 upon the polymer 130 component of the sectionalized containment combinations 100 herein. The result is an increased contacting surface area of the divider member 120 and item 140 for better adhesion and adhesive performance. This provides a significant advantage over conventional adhesive products (which typically exhibit compression properties as opposed to viscoelastic properties).

In addition, the polymer 130 component of the inventive sectionalized containment combinations 100 herein also exhibits advantageously unique adhesiveness properties. The overall tackiness, or adhesiveness, of the polymer 130 and its concomitant releasability characteristics can be effectively altered so as to match the needs of a particular divider member 120 or item 140 by changing the compositional makeup of the thermosetting reaction media, particularly the straight chain diol to crosslinking polyol reaction media weight ratio, as well as the reaction media plasticizer content and the types of plasticizers. For example, an increase in the amount of straight chain diol (with respect to the amount of crosslinking polyol) will tend to increase the adhesiveness of the polymer 130, and thus also increase the amount of force required to release a divider member 120 and/or an item 140 from the polymer 130. Conversely, an increase in the amount of crosslinking polyol (with respect to the amount of straight chain diol) will tend to decrease the adhesiveness of the polymer 130, and thus also decrease the amount of force required to release a divider member 120 and/or an item 140 from the polymer 130. In the case where the amount of straight chain diol (with respect to the amount of crosslinking polyol) is increased, it has been found herein that a slight increase in the amount of prepolymer will generally serve to balance the reaction media reactants. In general, sectionalized containment combinations 100 comprising the polymer 130 having a relatively high degree of adhesiveness will tend to be less effective for releasing relatively small, light and/or fragile items 140, but will tend to be more effective for adhering and stabilizing relatively larger, heavier and/or odd-shaped items 140. Typically, the adhesiveness of the polymer 130 component of this disclosure (and thus of the inventive sectionalized containment combinations 100 herein) will range from about 100 gf/cm$^2$ to about 2,500 gf/cm$^2$ as measured by the Adhesiveness and Cohesiveness Test, such as about 200 gf/cm$^2$ to about 2,000 gf/cm$^2$ or about 300 gf/cm$^2$ to about 1,500 gf/cm$^2$ to provide improved benefits.

Another unique advantage of the inventive sectionalized containment combinations 100 herein resides in the manner in which the viscoelastomeric thermoset polymer 130 component will adhesively interact with divider members 120 and items 140 which are adhesively attached thereto. The polymer 130 component's adhesive interaction with divider members 120 and items 140, when such are placed thereupon, typically exhibits a slight initial increase in adhesiveness within about 5 to about 10 seconds after the initial adhesive attachment to the polymer 130 component, which is then followed by a stabilization to about 90% of its maximum or ultimate adhesive attraction within about 60 seconds after the initial adhesive attachment to the polymer 130 component. This slight change in adhesiveness may be indicative of an intermolecular realignment, coordinate covalent bonding, polarization of the plasticizing components, or some other molecular interaction therewithin. This subsequent adhesive increase may also be due to the viscoelastomeric properties of the polymer 130 component, which due to adhesive cradling of a divider member 120 and/or an adhered item 140, will provide added interfacing surface contacting area with the adhered divider member 120 and/or item 140, resulting in an increase and subsequent stabilization of the adhesive attraction therebetween.

Another unique advantage of the inventive sectionalized containment combinations 100 herein resides in the retention of at least their adhesiveness and cohesiveness properties. Surprisingly, the thermoset viscoelastomeric polymer 130 component of the sectionalized containment combinations 100 as provided by this invention retains a substantially unchanged degree of adhesiveness and cohesiveness with respect to divider members 120 and adhered items 140 over prolonged periods of time (e.g., at least six (6) weeks or more), such as measured by the Adhesiveness and Cohesiveness Test. This provides another significant advantage over conventional adhesive products (wherein the adhesiveness and/or cohesiveness tends to degrade over time).

In addition, the polymer 130 component of the inventive sectionalized containment combinations 100 herein also exhibits advantageously unique cohesiveness properties. For example, upon exposure to a counteracting force sufficient to overcome the adhesive attraction between a divider member 120 and/or an item 140 and the adhesive sectionalized containment combination 100 herein (e.g., pulling an adhesively engaged divider member 120 or item 140 away from the polymer 130 component for disengagement therefrom), the compositional cohesiveness of the polymer 130 component will tenaciously retain its viscoelastomeric structural integrity by cohesively releasing substantially cleanly (i.e., without leaving substantially any visible polymeric residue) from the divider member 120 and/or item 140 and then returning to its original innate form as prior to engagement of the divider member 120 and/or item 140. This provides a significant advantage with respect to reusability and effectiveness of adhesive sectionalized containment combinations 100 comprising the polymer 130, as compared to conventional adhesive components (which typically do not return to their same innate form and/or which leave visible residue upon a detached item and/or which are not reusable (i.e., without experiencing a reduction in effectiveness)).

In addition, the polymer 130 component of the inventive sectionalized containment combinations 100 herein also exhibits advantageously unique releasability properties. More particularly, the polymer 130 component possesses a tenacious internal compositional cohesiveness which provides an ability to release substantially cleanly away from a divider member 120 and/or an item 140 upon which it comes into contact, substantially without leaving any residue of the polymer 130 remaining on the surface thereof. Indeed, upon exposure to a suitable adhesive separating release force (e.g., pulling an adhesively engaged divider member 120 or item 140 away from the polymer 130), the compositional cohesiveness of the polymer 130 component will tenaciously retain its viscoelastic structural integrity by separating substantially cleanly from the surface of a divider member 120 and/or an item 140 upon which it has come into contact (i.e., without leaving more than a trace of polymeric residue upon the surface). Accordingly, upon adhesive separation from such surface, the polymer 130 component will return to its substantially intact and innate form as prior to adherence of the divider member 120 and/or item 140, while leaving no more than a minuscule amount of polymeric residue adhering upon the surface thereof. More typically, upon separation from the surface of a divider member 120 and/or an item 140, there will exist no visible evidence (i.e., by a human eye having 20/20 vision) of polymeric residue remaining upon the surface thereof. This provides yet another significant advantage over conventional adhesive components (which typically leave a visually detectable amount of residue upon the surface of removed objects).

During the removal of a divider member 120 and/or an item 140 from the adhesive polymer 130 component of the inventive sectionalized containment combinations 100 of the present disclosure, it has been observed herein that the polymer 130 tends to pull away from the surface thereof until the polymer 130 completely separates (i.e., substantially breaks cleanly away) from the surface, and then the polymer 130 component forthrightly cohesively returns to its innate form as prior to adherence thereto. The extent of temporary distortion exhibited by the polymer 130 component upon exposure to separation forces from the surface of a divider member 120 and/or an item 140 will depend largely upon the adhesiveness, cohesiveness and viscoelastic properties of the polymer 130. It has been further observed herein that, upon coming into contact with a surface of a divider member 120 and/or an item 140, a polymer 130 herein having relatively higher adhesiveness values will physically tend to tenaciously string-out (similar to the pulling of heated candy taffy) until a clean adhesive, but cohesive, separation ultimately occurs from the surface thereof, whereupon the polymer 130 component then returns to its original innate form, leaving substantially no residue upon the divider member 120 and/or item 140.

In addition, the polymer 130 component of the inventive sectionalized containment combinations 100 herein also exhibits antimicrobial properties. For example, the polymer 130 can neutralize microbial pathogens (e.g., viruses, bacteria, germs, etc.) which may be present upon the engaged surfaces of an item 140. This can make the inventive sectionalized containment combinations 100 herein particularly suitable as hygienic sectionalized containers (e.g., medical, dental, pharmaceutical, etc.), and provides still another significant advantage over conventional adhesive components (which typically do not exhibit such antimicrobial properties).

In addition, the polymer 130 component of the inventive sectionalized containment combinations 100 herein also exhibits unique cleansability properties. For example, due to its adhesive nature, the polymer 130 component has a tendency to adhesively attract contaminants (e.g., dust, lint, debris, and other external contaminants, including contaminants from an item 140 and/or a user) which can potentially diminish adhesiveness over time. However, the original adhesiveness of the polymer 130 component can be easily restored via conventional washing and/or other suitable contaminant removal techniques. For example, unlike conventional adhesive components which must be discarded upon contamination (often after merely a single use), the polymer 130 component of the inventive sectionalized containment combinations 100 herein may be cleansed from contaminants and restored to their substantially original adhesive, cohesive and antimicrobial efficacy. Surprisingly, conventional washing with water or with a solution of water and common soap such as dish detergent (e.g., via rinsing, hand-washing, scrubbing, dishwashers, etc.), as well as autoclaving (i.e., applying high pressure steam), may be effectively utilized to eradicate and remove contaminants therefrom and thereby permit fully functional re-use of the cleansed inventive sectionalized containment combinations 100. In some alternative embodiments, the polymer 130 component can be removed from the support member 110 for cleansing and restoration of its adhesiveness, and then reapplied to the support member 110 for reuse. Accordingly, the sectionalized containment combinations 100 of this disclosure are environmentally friendly, and may be considered as "green" technology as well. This provides yet another significant advantage over conventional adhesive compositions (which typically do not exhibit such cleansability and reusability capabilities).

In some embodiments, the thermoset viscoelastomeric polymer 130 can be prefabricated into a desired form (e.g., desired shape profile, dimensions, etc.) using various techniques as known to persons having ordinary skill in the art. Such prefabrication techniques can include, but are not limited to, casting, molding, pouring, injecting, film forming, brushing, spraying, and the like. Prefabrication of the polymer 130 component typically comprises first preparing the thermosetting reaction media, then utilizing a desirable prefabrication process while the reaction media is in a liquid or semi-liquid (i.e., partially cured) form, and subsequently allowing the reaction media to fully cure into the polymer 130 component. This can be accomplished, inter alia, by disposing liquid reaction media (i.e., uncured or partially cured) into a suitable mold and then curing the reaction media to form the polymer 130 component, or by pouring a layer of the reaction media, allowing it to cure, and then cutting polymer 130 components therefrom. Other methods for forming the polymer 130 component which will be apparent to persons having ordinary skill in the art are also suitable, without departing from the scope of the invention. Such prefabricated form of the polymer 130 can have any shape profile and dimensions as may be desired without departing from the scope of the invention, including those known to persons having ordinary skill in the art, such as a layer, a pad, a substrate, an insert, a strip, a sheet, a film, an overlay, a mat, and the like. For embodiments comprising the polymer 130 component in a prefabricated form, the polymer 130 component can have a thickness which may be uniform or non-uniform. There is no particular limit to the thickness, provided that the sectionalized containment combination 100 performs as intended by the user. For example, in one non-limiting exemplary aspect, an adhesively applied polymer 130 component (e.g., wherein a prefabricated polymer 130 component is adhesively applied to the support member 110) can have a thickness of less than about 5 mm, such as less than about 3 mm, or less than about 1 mm, or about 0.05 mm to about 5 mm in thickness, to provide the desired cohesiveness, adhesiveness and releasability for removably adhering a divider member 120 and/or an item 140 to the sectionalized containment combination 100.

It has been discovered herein that certain polymeric materials, such as halogenated polymers (e.g., polyvinylchloride (PVC)) (except for special formulations) are generally adhesively incompatible with the adhesiveness properties of the thermoset viscoelastomeric polymer 130 component herein (i.e., the polymer 130 does not adhere well to such materials). As a result, such incompatible materials can provide excellent release properties from the polymer 130, which renders such incompatible materials particularly effective for use as a mold material which can be utilized to cure the reaction media and thus prefabricate the polymer 130 component. However, it should be understood that if such incompatible materials have a porous, fabric or patterned structure, such structures can provide anchoring or penetration sites for the polymer 130 component (e.g., due to the polymer's 130 viscoelastic nature), thus rendering such materials to be unsuitable for use as a mold material (and therefore more suitable for use as a support member 110 herein).

In other embodiments, the thermoset viscoelastomeric polymer 130 can be formed in combination with the support member 110. In such embodiments, the reaction media while in a liquid or partially-cured form is applied to a surface of the support member 110 and optionally allowed to soak at least partially into the material (such as where the support member 110 is porous). The reaction media is then allowed to fully cure in situ to form the thermoset viscoelastomeric polymer 130 component. It has been discovered herein that in such "in situ" embodiments, the polymer 130 tends to form a stronger bond with the support member 110 upon which it is applied, as compared the adhesive bonding of the prefabricated form. It is believed that in such in situ embodiments, attachment of the polymer 130 to the support member 110 includes additional bonding (e.g., chemical bonding) to the material, in addition to the adhesive bonding common to both the in situ embodiments and the prefabricated embodiments. For embodiments comprising the polymer 130 component applied by curing the reaction media in situ, the polymer 130 component can have a thickness which may be uniform or non-uniform. There is no particular limit to the thickness, provided that the sectionalized containment combination 100 performs as intended by the user. As compared to the polymer 130 component applied to a support member 110 in a prefabricated form, a lesser thickness of the polymer 110 component may be effectively utilized in these in situ embodiments. For example, in one non-limiting exemplary aspect, a polymer 130 component applied to a support member 110 via in situ curing can have a thickness of less than about 4 mm, such as less than about 2 mm, or less than about 0.05 mm, or about 0.03 mm to about 4 mm in thickness, to provide a suitable polymer 130 component for the inventive sectionalized containment combination 100.

The present disclosure also provides a method of providing an inventive sectionalized containment combination 100 for segregating items 140 and stabilizing the items 140 against movement. The method comprises:

a) providing a support member 110;
b) disposing an adhesive and cohesive viscoelastomeric thermoset polymer 130 upon a surface of the support member 110; and
c) adhesively engaging a repositionable divider member 120 onto the polymer 130 at a desired partitioning position.

In some aspects of these embodiments, the polymer 130 is prefabricated prior to disposing the polymer 130 upon the support member 110. In other aspects of these embodiments, the polymer 130 has been cured in situ upon the support member 110. In still other aspects of these embodiments, the polymer is derived from a thermosetting reaction media comprising about 2 wt % to about 10 wt % isocyanate prepolymer, about 35 wt % to about 75 wt % polyols, and about 10 wt % to about 60 wt % plasticizer, wherein the polyols comprise about 1 wt % to about 65 wt % straight chain diol by weight of the reaction media and about 3 wt % to about 50 wt % crosslinking polyol by weight of the reaction media, and wherein the plasticizer comprises about 10 wt % to less than 50 wt % epoxidized triglyceride plasticizer by weight of the reaction media and about 0 wt % to about 40 wt % viscosity reducing plasticizer by weight of the reaction media.

The present disclosure also provides a method for adjusting a sectionalized containment combination 100 for segregating items. The method comprises:

a) providing a sectionalized containment combination 100 comprising a support member 110, an adhesive and cohesive viscoelastomeric thermoset polymer 130 and a free-standing divider member 120, wherein the polymer 130 is disposed upon a surface of the support member 110, and wherein the divider member 120 is disposed upon the polymer 130;
b) removing the divider member 120 from the sectionalized containment combination 100 by exerting a sufficient removal force to counteract an adhesiveness of the polymer 130; and
c) disposing the divider member 120 onto the polymer 130 in a different configuration position.

In some aspects of these embodiments, the polymer 130 is derived from a thermosetting reaction media comprising about 2 wt % to about 10 wt % isocyanate prepolymer, about 35 wt % to about 75 wt % polyols, and about 10 wt % to about 60 wt % plasticizer, wherein the polyols comprise about 1 wt % to about 65 wt % straight chain diol by weight of the reaction media and about 3 wt % to about 50 wt % crosslinking polyol by weight of the reaction media, and wherein the plasticizer comprises about 10 wt % to less than 50 wt % epoxidized triglyceride plasticizer by weight of the reaction media and about 0 wt % to about 40 wt % viscosity reducing plasticizer by weight of the reaction media.

The present invention may be better understood with reference to the following example.

EXAMPLES

Example 1

A thermosetting reaction media suitably formulated to serve as a casted polymer 130 component upon a support member 110 in the form of a conventional food serving tray was prepared by uniformly admixing together a two-part solution component mix (Part A Solution and Part B Solution) comprising:

|  | Percent by Weight: |
|---|---|
| Part A Solution - Ingredients: |  |
| Methylene diphenyl diisocyanate-based glycol prepolymer (ELASTOCAST TQZP23 available from BASF Corporation) | 6.46 wt % |
| Epoxidized triglyceride plasticizer (epoxidized soybean oil) | 26.88 wt % |
| Viscosity reducing plasticizer (dibutyl sebacate) | 8.96 wt % |
| Part B Solution - Ingredients: |  |
| Polyether diol (ELASTOCAST C-4057 available from BASF Corporation) | 26.88 wt % |
| Polyether triol (ELASTOCAST C-4018 available from BASF Corporation) | 29.32 wt % |
| UV inhibitor (TINUVIN B75 available from BASF Corporation) | 1.30 wt % |
| Colorant (dye blend) | 0.05 wt % |
| Slow-acting Catalyst (COSCAT 83 available from Vertellus Holdings LLC) | 0.15 wt % |
| Total | 100% |

A support member 110 in the form of a conventional high-density polypropylene food tray was provided. The food tray was preflamed so as to permit a more effective bonding of the polymer 130 thereto.

The Part A ingredients were then mixed to form the Part A Solution. Separately, the Part B ingredients were mixed to form the Part B Solution. The Part A Solution and the Part B Solution were then combined and blended thoroughly to form a thermosetting reaction media. While still in liquid form, a quantity of the resulting thermosetting reaction media of this Example 1 was disposed onto the support member 110 to provide a substantially uniform coating having a thickness of about 2.5 mm. The casted and uncured thermosetting reaction media was allowed to fully cure to form an adhesive and cohesive viscoelastomeric thermoset polymer 130 bonded to the support member 110. A free-standing divider member 120 in the form of relatively rigid, flat and rectangular polypropylene having a length of about 27 cm, a height of about 4 cm, a general thickness of about 1.5 mm and an optional base element 125 thickness of about 3.0 mm was provided. The divider member 120 was then placed by hand upon the top side of the polymer 130 component at the approximate center thereof in an upright position using slight hand force, such that the optional base element 125 portion (i.e., the bottom end of the divider member 120) was in contact with the polymer 130, thus forming an inventive sectionalized containment combination 100 of the present invention, wherein the sectionalized containment combination 100 was generally divided in half by the divider member 120.

It was observed that the divider member 120 remained in a substantially upright position, even upon shaking the containment combination 100 and then inverting the combination 100 180° degrees. The divider member 120 was then removed from the polymer component 130 by hand (via exerting a sufficient counteracting removal force) and was inspected for residual polymer. No residual polymer was visually observed. The divider member 120 was then rotated (horizontally) 90° from its previous configuration and the bottom side (i.e., the optional base element 125) was once again placed into contact with the polymer 130 component by hand, thus repositioning the divider member 120. It was observed that the divider member 120 again remained in a substantially upright position.

A number of stowable conventional items 140 were then placed upon the polymer 130 component on either side of the divider member 120 of the sectionalized containment combination 100. Notwithstanding strenuous abusive mishandling, the emplaced items 140 adhesively maintained their original placement position upon the sectionalized containment combination 100. Similar results were achieved upon toting the loaded sectionalized containment combination 100 under rigorous toting conditions. Each item 140 was then removed by hand from the polymer 130 component of the sectionalized containment combination 100. It was observed that this was accomplished relatively easily without lifting the whole tray combination 100 when removing each particular item 140 therefrom.

It was noted that since the polymer 130 component adhesively restrained the items 140 in contact thereto, the support member 110 in the form of a tray as provided herein did not critically require being equipped with the divider member 120. In other words, the items 140 in contact with the polymer 130 remained segregated despite the presence of the divider member 120. Thus, at least in this instance, the term "tray" and "sectionalized containers" could apply to any substantially flat supportive structure (e.g. a platform with or without a raised rim or recessed structure) of sufficient size to provide the desired support of the adhesive polymer 130 for segregation of the stowed items 140.

Lastly, a standalone polymer 130 component of this Example 1 was separately formed and then tested in accordance with the Adhesiveness and Cohesiveness Test set forth herein. The average adhesiveness was measured to be about 800 gf/cm$^2$. It was also noted that no observable residual polymer remained upon the surface 345 of the cylinder 340 component of the testing apparatus 300 during each test iteration (see FIG. 6).

It will be appreciated that details of the foregoing examples, given for purposes of illustration, are not to be construed as limiting the scope of the present invention. Although only a few exemplary embodiments of the present invention have been described in detail above, persons having ordinary skill in the art will readily appreciate that many modifications are possible in the examples without materially departing from the novel teachings and advantages of this invention. For example, features described in relation to one example may be incorporated into any other example of the invention.

Accordingly, all such modifications are intended to be included within the scope of the present invention, which is defined in the following claims and all equivalents thereto. Further, it is recognized that many embodiments may be conceived that do not achieve all of the advantages of some embodiments, particularly of the desirable embodiments, yet the absence of a particular advantage shall not be construed to necessarily mean that such an embodiment is outside the scope of the present invention. As various changes could be made in the above constructions without departing from the scope of the invention, it is intended that all matter contained in the above description shall be interpreted as illustrative and not in a limiting sense.

What is claimed is:

1. A sectionalized containment combination comprising a support member, an adhesive and cohesive viscoelastomeric thermoset polymer disposed upon the support member, and a divider member adhesively disposed upon the polymer, wherein the divider member can be repositioned to adjust the sectionalized containment combination to a desired configuration for stowage use.

2. The sectionalized containment combination of claim 1, wherein the divider member is a free-standing divider member.

3. The sectionalized containment combination of claim 1, further comprising releasability properties such that the divider member can be removed upon application of a sufficient removal force without detachment of the polymer from the support member.

4. The sectionalized containment combination of claim 1, wherein the polymer is derived from a thermosetting reaction media comprising:
   a) about 2 wt % to about 10 wt % diisocyanate prepolymer;
   b) about 35 wt % to about 75 wt % polyols; and
   c) about 10 wt % to about 60 wt % plasticizer;
   wherein the polyols comprise about 1 wt % to about 65 wt % straight chain diol by weight of the reaction media and about 3 wt % to about 50 wt % crosslinking polyol by weight of the reaction media; and
   wherein the plasticizer comprises about 10 wt % to less than 50 wt % epoxidized triglyceride plasticizer by weight of the reaction media and 0 wt % to about 40 wt % ester plasticizer by weight of the reaction media.

5. The sectionalized containment combination of claim 4, wherein the plasticizer comprises about 10 wt % to less than 45 wt % epoxidized triglyceride plasticizer by weight of the reaction media.

6. The sectionalized containment combination of claim 4, wherein the diisocyanate prepolymer is selected from the group consisting of aromatic diisocyanates and aliphatic diisocyanates.

7. The sectionalized containment combination of claim 4, wherein the crosslinking polyol comprises triol.

8. The sectionalized containment combination of claim 4, further comprising a straight chain diol to crosslinking polyol weight ratio of about 1:3 to about 3:1.

9. The sectionalized containment combination of claim 4, wherein the ester plasticizer comprises a molecular weight of less than about 750.

10. The sectionalized containment combination of claim 1, wherein the polymer comprises an adhesiveness of about 100 gf/cm$^2$ to about 2,500 gf/cm$^2$.

11. The sectionalized containment combination of claim 1, wherein the support member comprises a substantially flat structure substantially free from any other confining structure.

12. The sectionalized containment combination of claim 1, wherein an item disposed upon the sectionalized containment combination is substantially prevented from movement thereupon.

13. The sectionalized containment combination of claim 1, further comprising cleansability and reusability properties, wherein a contaminant adhered to the polymer can be removed therefrom via washing with water, and wherein an adhesiveness of the polymer substantially returns to its original state upon fully drying.

14. The sectionalized containment combination of claim 1, further comprising antimicrobial properties.

15. A method of providing a sectionalized containment combination for segregating items and stabilizing the items against movement comprising:
   a) providing a support member;
   b) disposing an adhesive and cohesive viscoelastomeric thermoset polymer upon a surface of the support member; and
   c) adhesively engaging a repositionable divider member onto the polymer at a desired partitioning position.

16. The method of claim 15 wherein the polymer is prefabricated prior to disposing the polymer upon the support member.

17. The method of claim 15 wherein the polymer has been cured in situ upon the support member.

18. The method of claim 15 wherein the polymer is derived from a thermosetting reaction media comprising:
   a) about 2 wt % to about 10 wt % diisocyanate prepolymer;
   b) about 35 wt % to about 75 wt % polyols; and
   c) about 10 wt % to about 60 wt % plasticizer;
   wherein the polyols comprise about 1 wt % to about 65 wt % straight chain diol by weight of the reaction media and about 3 wt % to about 50 wt % crosslinking polyol by weight of the reaction media; and
   wherein the plasticizer comprises about 10 wt % to less than 50 wt % epoxidized triglyceride plasticizer by weight of the reaction media and 0 wt % to about 40 wt % ester plasticizer by weight of the reaction media.

19. A method for adjusting a sectionalized containment combination for segregating items comprising:
   a) providing a sectionalized containment combination comprising a support member, an adhesive and cohesive viscoelastomeric thermoset polymer and a free-standing divider member, wherein the polymer is disposed upon a surface of the support member, and wherein the divider member is disposed upon the polymer;
   b) removing the divider member from the sectionalized containment combination by exerting a sufficient removal force to counteract an adhesiveness of the polymer; and
   c) disposing the divider member onto the polymer in a different configuration position.

20. The method of claim 19 wherein the polymer is derived from a thermosetting reaction media comprising:
   a) about 2 wt % to about 10 wt % diisocyanate prepolymer;
   b) about 35 wt % to about 75 wt % polyols; and
   c) about 10 wt % to about 60 wt % plasticizer;
   wherein the polyols comprise about 1 wt % to about 65 wt % straight chain diol by weight of the reaction media and about 3 wt % to about 50 wt % crosslinking polyol by weight of the reaction media; and
   wherein the plasticizer comprises about 10 wt % to less than 50 wt % epoxidized triglyceride plasticizer by weight of the reaction media and 0 wt % to about 40 wt % ester plasticizer by weight of the reaction media.

* * * * *